US012754869B2

(12) United States Patent
Brophy et al.

(10) Patent No.: US 12,754,869 B2
(45) Date of Patent: Oct. 6, 2026

(54) BUILDING MANAGEMENT SYSTEM WITH UNIVERSAL SERIAL BUS (USB) BUILDING DEVICES

(71) Applicant: Tyco Fire & Security GmbH, Neuhausen am Rheinfall (CH)

(72) Inventors: Christopher Brophy, Cedarburg, WI (US); Justin J. Seifi, Cedarburg, WI (US); Alan J. Bronikowski, South Milwaukee, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 376 days.

(21) Appl. No.: 18/231,213

(22) Filed: Aug. 7, 2023

(65) Prior Publication Data

US 2023/0376444 A1 Nov. 23, 2023

Related U.S. Application Data

(63) Continuation-in-part of application No. 16/890,808, filed on Jun. 2, 2020, now Pat. No. 11,740,601.

(Continued)

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ............... G06F 13/4282; G06F 13/382; G06F 2213/0042
See application file for complete search history.

(56) References Cited

U.S. PATENT DOCUMENTS 8,390,454 B2 3/2013 Lyon et al.
8,870,087 B2 10/2014 Pienta et al.
(Continued)

FOREIGN PATENT DOCUMENTS

CN 107293889 A 10/2017
KR 2002066108 A 8/2002
(Continued)

OTHER PUBLICATIONS

US Final Office Action on U.S. Appl. No. 16/890,808 dated Dec. 14, 2022 (33 pages).
(Continued)

*Primary Examiner* — Chad G Erdman
(74) *Attorney, Agent, or Firm* — Foley & Lardner LLP

(57) ABSTRACT

A building system of a building, the building system including an embedded computer, the embedded computer including one or more circuits configured to implement a universal serial bus (USB) host and communicate with peripheral USB building devices via the USB host, receive building data from at least one of the peripheral USB building devices, generate one or more control decisions for one or more of the peripheral USB building devices, and communicate the one or more control decisions to the one or more of the peripheral USB building devices via USB connection. The building system includes the peripheral USB building devices, wherein each of the peripheral USB building devices are connected to the USB host via at least one of a direct USB connection to the embedded computer or an indirect USB connection through another one of the peripheral USB building devices.

22 Claims, 17 Drawing Sheets

Related U.S. Application Data

(60) Provisional application No. 62/857,118, filed on Jun. 4, 2019.

(56) References Cited

U.S. PATENT DOCUMENTS

| | | | | |
|---|---|---|---|---|
| 9,746,199 | B1 | 8/2017 | Drees et al. | |
| 9,971,364 | B2 | 5/2018 | Zywicki et al. | |
| 2006/0095595 | A1 | 5/2006 | Dalton et al. | |
| 2015/0045960 | A1 * | 2/2015 | Caron | G06F 11/0793 700/276 |
| 2016/0209899 | A1 * | 7/2016 | Brantner | H04W 4/80 |
| 2016/0323736 | A1 * | 11/2016 | Donahue | H04H 60/23 |
| 2016/0370835 | A1 * | 12/2016 | Erickson | G06F 1/266 |
| 2017/0116137 | A1 * | 4/2017 | Hough | G06F 13/102 |
| 2017/0357607 | A1 | 12/2017 | Cayemberg et al. | |
| 2018/0119975 | A1 | 5/2018 | Park et al. | |
| 2018/0150121 | A1 * | 5/2018 | Basterash | G06F 1/266 |
| 2018/0187909 | A1 | 7/2018 | Drees et al. | |
| 2018/0238577 | A1 | 8/2018 | Drees et al. | |
| 2018/0239371 | A1 | 8/2018 | Drees et al. | |
| 2018/0314219 | A1 | 11/2018 | Gamroth et al. | |
| 2019/0013023 | A1 | 1/2019 | Pourmohammad et al. | |
| 2019/0147883 | A1 | 5/2019 | Mellenthin et al. | |
| 2020/0089637 | A1 * | 3/2020 | Ng | G06F 40/205 |
| 2020/0225653 | A1 * | 7/2020 | Lamont | G05D 7/0635 |

FOREIGN PATENT DOCUMENTS

| | | | | | |
|---|---|---|---|---|---|
| KR | 20070107983 | A | * | 11/2007 | H04W 12/06 |
| WO | WO-2016179042 | A1 | * | 11/2016 | H01R 31/065 |

OTHER PUBLICATIONS

US Non-Final Office Action on U.S. Appl. No. 16/890,808 dated May 10, 2022 (30 pages).

US Notice of Allowance on U.S. Appl. No. 16/890,808 dated Apr. 5, 2023 (7 pages).

USB Boards, Orange Tree Technologies, URL: https://www.orangetreetech.com/products/usb-boards, Retrieved 2019, 3 pages (if printed).

* cited by examiner

BUILDING MANAGEMENT SYSTEM WITH UNIVERSAL SERIAL BUS (USB) BUILDING DEVICES

CROSS-REFERENCE TO RELATED PATENT APPLICATION

This application in continuation-in-part of U.S. patent application Ser. No. 16/890,808, filed on Jun. 2, 2020, which claims the benefit of and priority to U.S. Provisional Patent Application No. 62/857,118 filed on Jun. 4, 2019, the entire disclosure of which is incorporated by reference herein.

BACKGROUND

The present disclosure relates generally to universal serial bus (USB). The present disclosure relates more particularly to USB in building management systems.

A building management system (BMS) is, in general, a system of devices configured to control, monitor, and manage equipment in or around a building or building area. A BMS can include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas. A BMS may include METASYS® or VERASYS® building controllers or other devices sold by Johnson Controls, Inc., as well as building devices and components from other sources.

SUMMARY

One implementation of the present disclosure is a building system of a building, the building system including an embedded computer, the embedded computer including one or more circuits configured to implement a universal serial bus (USB) host and communicate with peripheral USB building devices via the USB host, receive building data from at least one of the peripheral USB building devices, generate one or more control decisions for one or more of the peripheral USB building devices, and communicate the one or more control decisions to the one or more of the peripheral USB building devices via one or more USB connections. The system includes the peripheral USB building devices, wherein each of the peripheral USB building devices are connected to the USB host via at least one of a direct USB connection to the embedded computer or an indirect USB connection through another one of the peripheral USB building devices.

In some embodiments, the embedded computer is connected to an Ethernet network and receives power over Ethernet (PoE), wherein the embedded computer is configured to power the one or more circuits based on the PoE and provide USB power to the peripheral USB building devices via the PoE.

In some embodiments, a first peripheral USB building device of the peripheral USB building devices includes a USB hub circuit. In some embodiments, a second peripheral USB building device of the peripheral USB building devices communicates to the embedded computer via a first USB connection to the USB hub circuit of the first peripheral USB building device and a second USB connection between the USB hub circuit and the embedded computer.

In some embodiments, a first peripheral USB building device of the peripheral USB building devices is configured to communicate identifying information to the embedded computer in response to being connected to the embedded computer via a USB connection. In some embodiments, the one or more circuits of the embedded computer are configured to receive the identifying information and identify driver software for the first peripheral USB building device and a control algorithm for the first peripheral USB building device, generate the one or more control decisions for the first peripheral USB building device based on the control algorithm, and communicate the one or more control decisions to the first peripheral USB building device via the USB connection with the driver software.

In some embodiments, a first peripheral USB building device of the peripheral USB building devices is configured to store licensing data associated with one or more features for the first peripheral USB building device and communicate the licensing data to the embedded computer via a USB connection in response to being connected to the embedded computer via the USB connection. In some embodiments, the one or more circuits of the embedded computer are configured to receive the licensing data via the USB connection, enforce the licensing data on the one or more circuits enabling the one or more features, and perform the one or more features by generating result data based on collected building data of the first peripheral USB building device or performing one or more control operations for the first peripheral USB building device.

In some embodiments, the system further includes a USB host actuator, wherein the USB host actuator is configured to connect to an Ethernet network and implement a second USB host, wherein the USB host actuator is configured to facilitate communication between a site director system connected to the Ethernet network and second peripheral USB building devices connected via one or more USB connections to the USB host actuator.

In some embodiments, the embedded computer and the peripheral USB building devices form an air handler unit (AHU) package, wherein the embedded computer is configured to perform one or more control operations for an AHU and the peripheral USB building devices are AHU sensors and AHU actuators of the AHU.

In some embodiments, each of the peripheral USB building devices receive USB power from the embedded computer and operates based on the USB power.

In some embodiments, the building system includes a USB actuator of the peripheral USB building devices, wherein the USB actuator includes an actuator device configured to operate to control an environmental condition of the building, an energy storage device configured to store energy and discharge the energy, and a charging circuit configured to receive the USB power from the embedded computer and charge the energy storage device based on the USB power, receive a command, via a USB connection, to operate the actuator device from the embedded computer, and operate the actuator device by causing the energy storage device to discharge the energy.

In some embodiments, the system further includes a USB host gateway, wherein the USB host gateway is configured to connect to an Ethernet network and implement a second USB host, wherein the USB host gateway is configured to facilitate communication between a site director system connected to the Ethernet network and second peripheral USB building devices connected via one or more USB connections to the USB host gateway.

In some embodiments, the USB host gateway is further configured to implement a USB hub, wherein the USB hub includes direct USB connections to at least some of the peripheral USB building devices.

In some embodiments, a first peripheral USB building device of the peripheral USB building devices is configured to collect building data and encrypt the building data, communicate the encrypted building data to the embedded computer via a USB connection, receive encrypted operational data encrypted by the embedded computer, the operational data generated by the embedded computer based on the building data, and decrypt the encrypted operational data and operate based on the operational data.

In some embodiments, the one or more circuits of the embedded computer are configured to receive the encrypted building data from the first peripheral USB building device, decrypt the encrypted building data and generate operational data based on the building data, and encrypt the operational data and communicate the encrypted operational data to the first peripheral USB building device via the USB connection.

In some embodiments, the peripheral USB building devices include a USB input and output module (IOM). In some embodiments, the USB IOM includes one or more second circuits, one or more physical inputs, and one or more physical outputs. In some embodiments, the one or more second circuits are configured to receive the building data via the one or more physical inputs, communicate the building data to the embedded computer via a USB connection, receive the one or more control decisions via the USB connection from the embedded computer, and operate the one or more physical outputs based on the one or more control decisions.

In some embodiments, the building system includes one or more sensor devices configured to measure the building data, wherein the one or more sensor devices are connected to the one or more physical inputs of the USB IOM. In some embodiments, the building system includes one or more actuator devices configured to control an environmental condition of the building, wherein the one or more actuator devices are connected to the one or more physical outputs.

In some embodiments, the building system includes the one or more second circuits are configured to identify one or more critical operations by comparing the building data to one or more rules, wherein the one or more rules indicate an emergency situation in the building and at least one critical operation responding to the emergency situation and perform the one or more critical operations based on the comparing of the building data to the one or more rules.

In some embodiments, the one or more second circuits of the USB IOM include an RS485 circuit. In some embodiments, the one or more second circuits are configured to receive first building data from a first building device via an RS485 connection between the first building device and the RS485 circuit, communicate the first building data to the embedded computer via the USB connection, receive one or more first control decisions via the USB connection from the embedded computer, and communicate the one or more first control decisions to the first building device via the RS485 connection.

Some embodiments relate to a building system of a building. The building system includes an embedded computer with one or more circuits configured to:

implement a universal serial bus (USB) host and communicate with one or more of peripheral USB building devices via at least one of a USB connection or the USB host;

receive building data from at least one of the one or more of peripheral USB building devices;

generate one or more control decisions for the one or more of peripheral USB building devices; and communicate the one or more control decisions to the one or more of peripheral USB building devices via one or more USB connections. The building system also can include the one or more of peripheral USB building devices. The one or more of peripheral USB building devices are connected to the USB host via at least one of a direct USB connection to the embedded computer or an indirect USB connection through another one of the one or more of peripheral USB building devices. The USB connection is provided using RS-485, RS 232, Ethernet twisted pair, or telephone wiring.

Some embodiments relate to a method of connecting components in a building system of a building. The building system includes an embedded computer. The method includes providing a universal serial bus (USB) using RS-485, RS 232, Ethernet twisted pair, or telephone wiring, receiving building data from one or more of peripheral USB building devices using the USB, and providing one or more control decisions for the one or more of peripheral USB building devices for communication the one or more control decisions to the one or more of peripheral USB building devices via the USB.

In some embodiments, the one or more of peripheral USB building devices are connected to the USB host via at least one of a direct USB connection to the embedded computer or an indirect USB connection through another one of the one or more of peripheral USB building devices. In some embodiments, the USB RS-485, RS 232, Ethernet twisted pair, or telephone wiring is existing building wiring.

Some embodiments relate to a building system of a building. The building system includes an embedded computer including one or more circuits configured to:

implement a universal serial bus (USB) host and communicate with one or more of peripheral USB building devices via at least one of a USB connection to the USB host using twisted pair wiring for an RS-485 bus device, a RS 232 bus device, an Ethernet, or a telephone;

receive building data from at least one of the one or more of peripheral USB building devices;

receive one or more control decisions from an external processor for the one or more of peripheral USB building devices; and communicate the one or more control decisions to the one or more of peripheral USB building devices via one or more USB connections.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

DETAILED DESCRIPTION

Overview

Figure 1:
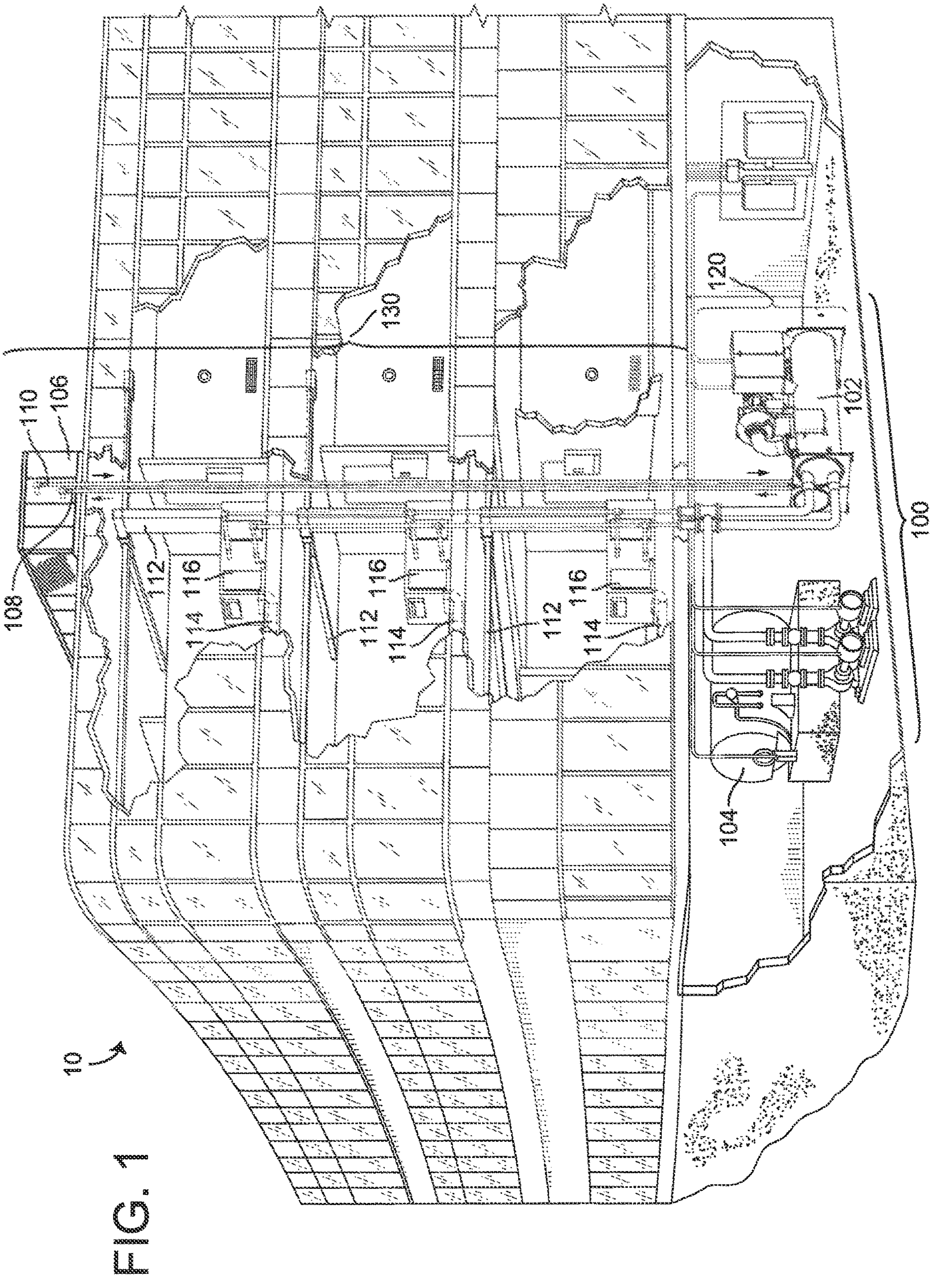
FIG. 1 is drawing of a building equipped with a heating, ventilating, and air conditioning (HVAC) system, according to an exemplary embodiment.

Referring generally to the FIGURES, systems and methods for peripheral USB building devices managed by an embedded computer are shown, according to various exemplary embodiments. A USB connection from an embedded computer can be used to communicate with peripheral USB building devices. The embedded computer can be any type of computer, in some embodiments, a fan-less small-form factor personal computer (PC). The embedded computer can be configured to communicate with the low-cost, low computing power, and/or low-power peripheral USB building devices and manage, e.g., receive information from and/or control, the peripheral USB building devices. Embedded PCs can be low cost and have low power requirements. These embedded PCs can be applicable for performing HVAC algorithms and equipment control. The embedded PC can control a USB input/output module (IOM) (or any other peripheral USB building device with inputs and/or outputs) which can include a SNC baseboard including a microcontroller (MCU) and/or microprocessor (MPU) (e.g., an RX processor) and USB interface to directly command I/O (e.g., communicate to a peripheral USB building device). An SNC may be a network configuration engine (NCE), e.g., a tier between a site director system and a field controller. This tier can be replaced with an embedded PC and a USB IOM. The embedded PC can be configured to run custom firmware to manage the peripheral USB building devices via the USB connection.

The peripheral USB building devices can be a USB IOM. The USB IOM can provide a physical interface between building devices such as sensors or actuators and the embedded computer. The USB IOM can provide physical control and reception of inputs and outputs at terminal points. In contrast, a Network Control Engine (NCE) and/or Field Controller (FEC) with SNC hardware can be configured to perform control algorithms and operate equipment, this can instead be performed by the embedded computer while the USB IOM can provide, via a USB connection, a physical interface for the embedded computer to end sensors or actuators. An embedded PC, together with a USB IOM, can replace an existing network configuration engine (NCE) and/or FEC. A configuration with an embedded computer and a USB IOM provides computing power and density and other capabilities over existing embedded processor solutions. Using an embedded PC with a USB IOM can reduce equipment footprint, equipment cost, reduce installation requirements, and increase customization as compared to an NCE with an FEC.

Rather than including significant computing power within the USB IOM, or another peripheral building USB device, the computing power can be located within the embedded computer and the USB IOM and/or the peripheral building USB device can communicate collected data to the embedded computer, and the embedded computer can make control decisions for the USB IOM and/or the peripheral building USB device. In some embodiments, the USB IOM and/or the peripheral building USB device can be configured to perform time critical operations or data preparation operations before communicating data to the embedded computer.

The USB IOM provides scalability and flexible configuration for a larger number of customer applications and/or use-cases. Rather than requiring a building owner to purchase field controllers with fixed I/O points, pairing multiple USB IOM modules with a single embedded computer can increase equipment combinations and allows for future equipment expansion. In some embodiments, multiple USB IOMs can be connected directly to the embedded computer, and/or daisy chained together. For example, the internal hub of the embedded computer can allow a first USB IOM to connect directly to the embedded computer while a second USB IOM can be connected to the first USB IOM and indirectly to the embedded computer. This form of daisy chaining USB connections can allow for easy expansion of peripheral USB devices. Daisy chaining the USB IOM can increase installation convenience and reduce equipment costs when adding multiple USB IOM.

Furthermore, one or multiple USB IOMs offers an end user a high degree of modularity in I/O providing value and customization options for end users. To this end, various different USB IOM can be available to an end user with various numbers of inputs and/or outputs. Without requiring replacement of the embedded PC, a user can select and install a particular USB IOM that is specific to an application of the user. This is advantageous over limited and/or static Field Controller and IOM offerings.

In some embodiments, a host USB device, e.g., the embedded computer, can power the peripheral USB building devices, e.g., the USB IOM. The host USB device can power the peripheral USB building devices via USB, e.g., USB 3.x, USB 4.x/USB-C. Furthermore, when a peripheral USB device is connected to the embedded computer, the embedded computer can automatically install any drivers and/or control algorithms to operate the peripheral USB building device. Powering the peripheral USB building devices via USB and automatically configuring software facilitates easy installation and requires less configuration and installation time.

In some embodiments, the embedded computer is connected to one or multiple building power outlets via USB cables where each of the building power outlets include a USB connection. In this regard, a building owner can easily install a zone sensor or zone thermostat by connecting a USB sensor or USB actuator to the power outlet.

Building and HVAC System

Referring now to FIG. 1, an exemplary building and HVAC system in which the systems and methods of the present invention can be implemented are shown, according to an exemplary embodiment. In FIG. 1, a perspective view of a building 10 is shown. Building 10 is served by a HVAC system 100. HVAC system 100 can include HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve setpoint conditions for the building zone.

Building Management System

Figure 2:
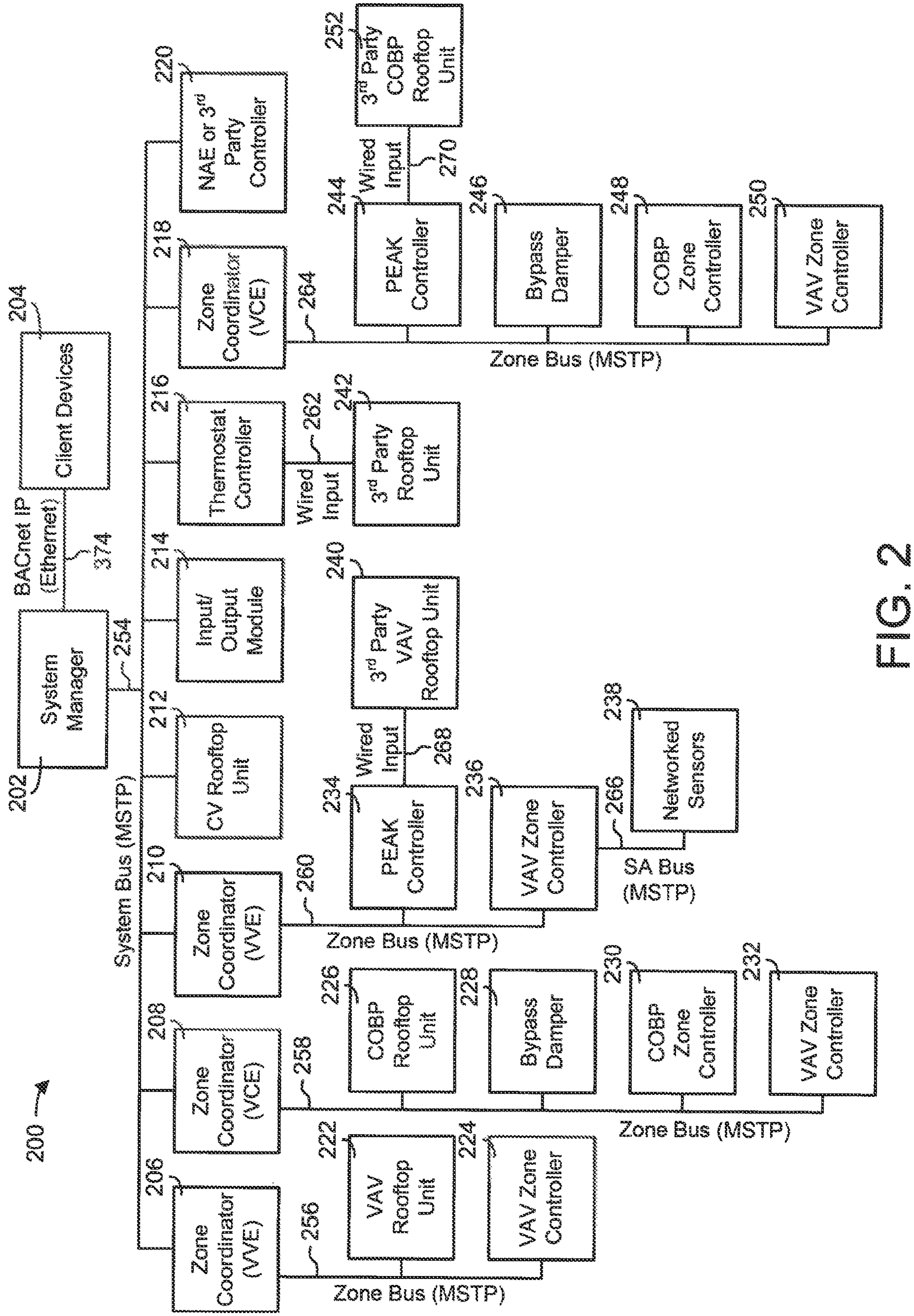
FIG. 2 is a block diagram of a building management system (BMS) which can be used to monitor and control the building and HVAC system of FIG. 1, according to an exemplary embodiment.

Referring now to FIG. 2, a block diagram of a building management system (BMS) 200 is shown, according to an exemplary embodiment. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 200 can be used to monitor and control the devices of HVAC system 100 and/or airside system 200 (e.g., HVAC equipment) as well as other types of BMS devices (e.g., lighting equipment, security equipment, etc.).

In brief overview, BMS 200 provides a system architecture that facilitates automatic equipment discovery and equipment model distribution. Equipment discovery can occur on multiple levels of BMS 200 across multiple different communications busses (e.g., a system bus 254, zone buses 256-260 and 264, sensor/actuator bus 266, etc.) and across multiple different communications protocols. In some embodiments, equipment discovery is accomplished using active node tables, which provide status information for devices connected to each communications bus. For example, each communications bus can be monitored for new devices by monitoring the corresponding active node table for new nodes. When a new device is detected, BMS 200 can begin interacting with the new device (e.g., sending control signals, using data from the device) without user interaction.

Some devices in BMS 200 present themselves to the network using equipment models. An equipment model defines equipment object attributes, view definitions, schedules, trends, and the associated BACnet value objects (e.g., analog value, binary value, multistate value, etc.) that are used for integration with other systems. An equipment model for a device can include a collection of point objects that provide information about the device (e.g., device name, network address, model number, device type, etc.) and store present values of variables or parameters used by the device. For example, the equipment model can include point objects (e.g., standard BACnet point objects) that store the values of input variables accepted by the device (e.g., setpoint, control parameters, etc.), output variables provided by the device (e.g., temperature measurement, feedback signal, etc.), configuration parameters used by the device (e.g., operating mode, actuator stroke length, damper position, tuning parameters, etc.). The point objects in the equipment model can be mapped to variables or parameters stored within the device to expose those variables or parameters to external systems or devices.

Some devices in BMS 200 store their own equipment models. Other devices in BMS 200 have equipment models stored externally (e.g., within other devices). For example, a zone coordinator 208 can store the equipment model for a bypass damper 228. In some embodiments, zone coordinator 208 automatically creates the equipment model for bypass damper 228 or other devices on zone bus 258. Other zone coordinators can also create equipment models for devices connected to their zone busses. The equipment model for a device can be created automatically based on the types of data points exposed by the device on the zone bus, device type, and/or other device attributes. Several examples of automatic equipment discovery and equipment model distribution are discussed in greater detail below.

Still referring to FIG. 2, BMS 200 is shown to include a system manager 202; several zone coordinators 206, 208, 210 and 218; and several zone controllers 224, 230, 232, 236, 248, and 250. System manager 202 can communicate with client devices 204 (e.g., user devices, desktop computers, laptop computers, mobile devices, etc.) via a data communications link 374 (e.g., BACnet IP, Ethernet, wired or wireless communications, etc.). System manager 202 can provide a user interface to client devices 204 via data communications link 374. The user interface may allow users to monitor and/or control BMS 200 via client devices 204.

In some embodiments, system manager 202 is connected with zone coordinators 206-210 and 218 via a system bus 254. System bus 254 can include any of a variety of communications hardware (e.g., wire, optical fiber, terminals, etc.) configured to facilitate communications between system manager and other devices connected to system bus 254. Throughout this disclosure, the devices connected to system bus 254 are referred to as system bus devices. System manager 202 can be configured to communicate with zone coordinators 206-210 and 218 via system bus 254 using a master-slave token passing (MSTP) protocol or any other communications protocol. System bus 254 can also connect system manager 202 with other devices such as a constant volume (CV) rooftop unit (RTU) 212, an input/output module (IOM) 214, a thermostat controller 216 (e.g., a TEC2000 series thermostat controller), and a network automation engine (NAE) or third-party controller 220. RTU 212 can be configured to communicate directly with system manager 202 and can be connected directly to system bus 254. Other RTUs can communicate with system manager 202 via an intermediate device. For example, a wired input 262 can connect a third-party RTU 242 to thermostat controller 216, which connects to system bus 254.

System manager 202 can provide a user interface for any device containing an equipment model. Devices such as zone coordinators 206-210 and 218 and thermostat controller 216 can provide their equipment models to system manager 202 via system bus 254. In some embodiments, system manager 202 automatically creates equipment models for connected devices that do not contain an equipment model (e.g., IOM 214, third party controller 220, etc.). For example, system manager 202 can create an equipment model for any device that responds to a device tree request. The equipment models created by system manager 202 can be stored within system manager 202. System manager 202 can then provide a user interface for devices that do not contain their own equipment models using the equipment models created by system manager 202. In some embodiments, system manager 202 stores a view definition for each type of equipment connected via system bus 254 and uses the stored view definition to generate a user interface for the equipment.

Each zone coordinator 206-210 and 218 can be connected with one or more of zone controllers 224, 230-232, 236, and 248-250 via zone buses 256, 258, 260, and 264. Zone busses 256, 258, 260, and 264 can include any of a variety of communications hardware (e.g., wire, optical fiber, terminals, etc.) configured to facilitate communications between a zone coordinator and other devices connected to the corresponding zone bus. Throughout this disclosure, the devices connected to zone busses 256, 258, 260, and 264 are referred to as zone bus devices. Zone coordinators 206-210 and 218 can communicate with zone controllers 224, 230-232, 236, and 248-250 via zone busses 256-260 and 264 using a MSTP protocol or any other communications protocol. Zone busses 256-260 and 264 can also connect zone coordinators 206-210 and 218 with other types of devices such as variable air volume (VAV) RTUs 222 and 240, changeover bypass (COBP) RTUs 226 and 252, bypass dampers 228 and 246, and PEAK controllers 234 and 244.

Zone coordinators 206-210 and 218 can be configured to monitor and command various zoning systems. In some embodiments, each zone coordinator 206-210 and 218 monitors and commands a separate zoning system and is connected to the zoning system via a separate zone bus. For example, zone coordinator 206 can be connected to VAV RTU 222 and zone controller 224 via zone bus 256. Zone coordinator 208 can be connected to COBP RTU 226, bypass damper 228, COBP zone controller 230, and VAV zone controller 232 via zone bus 258. Zone coordinator 210 can be connected to PEAK controller 234 and VAV zone controller 236 via zone bus 260. Zone coordinator 218 can be connected to PEAK controller 244, bypass damper 246, COBP zone controller 248, and VAV zone controller 250 via zone bus 264.

A single model of zone coordinator 206-210 and 218 can be configured to handle multiple different types of zoning systems (e.g., a VAV zoning system, a COBP zoning system, etc.). Each zoning system can include a RTU, one or more zone controllers, and/or a bypass damper. For example, zone coordinators 206 and 210 are shown as Verasys VAV engines (VVEs) connected to VAV RTUs 222 and 240, respectively. Zone coordinator 206 is connected directly to VAV RTU 222 via zone bus 256, whereas zone coordinator 210 is connected to a third-party VAV RTU 240 via a wired input 268 provided to PEAK controller 234. Zone coordinators 208 and 218 are shown as Verasys COBP engines (VCEs) connected to COBP RTUs 226 and 252, respectively. Zone coordinator 208 is connected directly to COBP RTU 226 via zone bus 258, whereas zone coordinator 218 is connected to a third-party COBP RTU 252 via a wired input 270 provided to PEAK controller 244.

Zone controllers 224, 230-232, 236, and 248-250 can communicate with individual BMS devices (e.g., sensors, actuators, etc.) via sensor/actuator (SA) busses. For example, VAV zone controller 236 is shown connected to networked sensors 238 via SA bus 266. Networked sensors 238 can include, for example, temperature sensors, humidity sensors, pressure sensors, lighting sensors, security sensors, or any other type of device configured to measure and/or provide an input to zone controller 236. Zone controller 236 can communicate with networked sensors 238 using a MSTP protocol or any other communications protocol. Although only one SA bus 266 is shown in FIG. 2, it should be understood that each zone controller 224, 230-232, 236, and 248-250 can be connected to a different SA bus. Each SA bus can connect a zone controller with various sensors (e.g., temperature sensors, humidity sensors, pressure sensors, light sensors, occupancy sensors, etc.), actuators (e.g., damper actuators, valve actuators, etc.) and/or other types of controllable equipment (e.g., chillers, heaters, fans, pumps, etc.).

Each zone controller 224, 230-232, 236, and 248-250 can be configured to monitor and control a different building zone. Zone controllers 224, 230-232, 236, and 248-250 can use the inputs and outputs provided via their SA busses to monitor and control various building zones. For example, a zone controller 236 can use a temperature input received from networked sensors 238 via SA bus 266 (e.g., a measured temperature of a building zone) as feedback in a temperature control algorithm. Zone controllers 224, 230-232, 236, and 248-250 can use various types of control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control a variable state or condition (e.g., temperature, humidity, airflow, lighting, etc.) in or around building 10.

Figure 3:
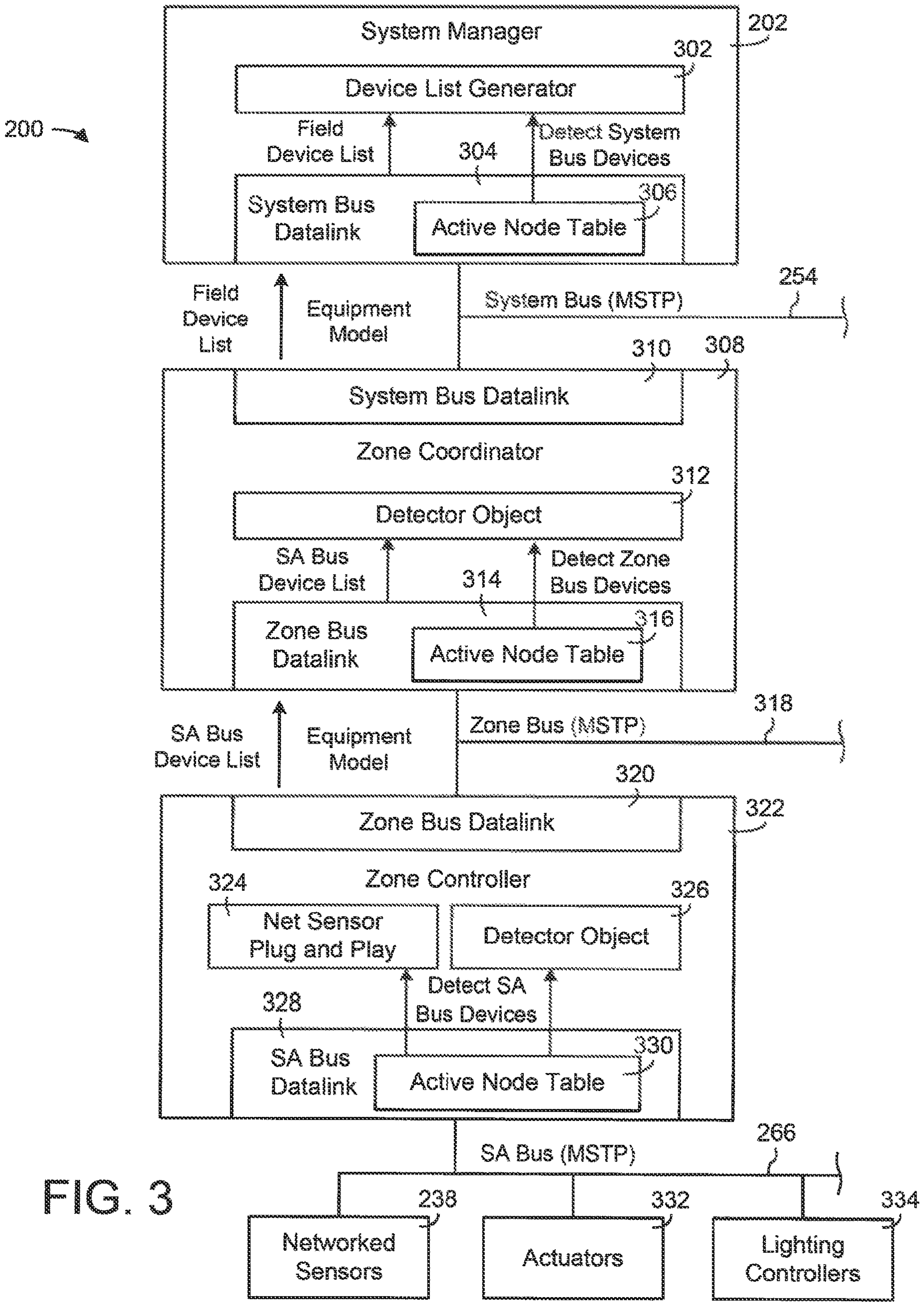
FIG. 3 is a block diagram illustrating a system manager, zone coordinator, and zone controller of the BMS of FIG. 2 in greater detail, according to an exemplary embodiment.

Referring now to FIG. 3, a block diagram illustrating a portion of BMS 200 in greater detail is shown, according to an exemplary embodiment. BMS 200 is shown to include system manager 202, a zone coordinator 308, and a zone controller 322. Zone coordinator 308 can be any of zone coordinators 206-210 or 218. Zone controller 322 can be any of zone controllers 224, 230, 232, 236, 248, or 250. Zone coordinator 308 can be connected with system manager via system bus 254. For example, system bus 254 is shown connecting a first system bus datalink 304 within system manager 202 with a second system bus datalink 310 within zone coordinator 308. Zone coordinator 308 can connected with zone controller 322 via a zone bus 318. For example, zone bus 318 is shown connecting a first zone bus datalink 314 within zone coordinator 308 with a second zone bus datalink 320 within zone controller 322. Zone bus 318 can be any of zone busses 256-260 or 264. Zone controller 322 is connected with networked sensors 238 and actuators 332 via a SA bus 266.

BMS 200 can automatically discover new equipment connected to any of system bus 254, zone bus 318, and SA bus 266. Advantageously, the equipment discovery can occur automatically (e.g., without user action) without requiring the equipment to be placed in discovery mode and without sending a discovery command to the equipment. In some embodiments, the automatic equipment discovery is based on active node tables for system bus 254, zone bus 318, and SA bus 266. Each active node table can provide status information for the devices communicating on a particular bus. For example, the active node table 306 for system bus 254 can indicate which MSTP devices are participating in the token network (e.g., a token ring) used to exchange information via system bus 254. Active node table 306 can identify the devices communicating on system bus 254 by MAC address or other device identifier. Devices that do not participate in the token ring (e.g., MSTP slave devices) can be automatically discovered using a net sensor plug and play (described in greater detail below).

The active node table for each communications bus can be stored within one or more devices connected to the bus. For example, active node table 306 can be stored within system manager 202. In some embodiments, active node table 306 is part of a system bus datalink 304 (e.g., a MSTP datalink) used by system manager 202 to communicate via system bus 254. System manager 202 can subscribe to changes in value of active node table 306 and can receive a notification (e.g., from system bus datalink 304) when a change in active node table 306. In response to a notification that a change in active node table 306 has occurred, system manager 202 can read active node table 306 to detect and identify the devices connected to system bus 254.

In some embodiments, a device list generator 302 within system manager 202 generates a list of the devices connected to system bus 254 (i.e., a device list) based on active node table 306 and stores the device list within system manager 202. The device list generated by system manager 202 can include information about each device connected to system bus 254 (e.g., device type, device model, device ID, MAC address, device attributes, etc.). When a new device is detected on system bus 254, system manager 202 can automatically retrieve the equipment model from the device if the device stores its own equipment model. If the device does not store its own equipment model, system manager 202 can retrieve a list of point values provided by the device. System manager 202 can then use the equipment model and/or list of point values to present information about the connected system bus devices to a user.

The active node tables for each zone bus can be stored within the zone coordinator connected to the zone bus. For example, the active node table 316 for zone bus 318 can be stored within zone coordinator 308. In some embodiments, active node table 316 is part of a zone bus datalink 314 (e.g., a MSTP datalink) used by the zone coordinator 308 to communicate via zone bus 318. Zone coordinator 308 can subscribe to changes in value of active node table 316 and can receive a notification (e.g., from zone bus datalink 314) when a change in active node table 316 occurs. In response to a notification that a change to active node table 316 has occurred, zone coordinator 308 can read active node table 316 to identify the devices connected to zone bus 318.

In some embodiments, a detector object 312 of zone coordinator 308 generates a list of the devices communicating on zone bus 318 (i.e., a device list) based on active node table 316 and stores the device list within zone coordinator 308. Each zone coordinator in BMS 200 can generate a list of devices on the connected zone bus. The device list generated by each zone coordinator 308 can include information about each device connected to zone bus 318 (e.g., device type, device model, device ID, MAC address, device attributes, etc.). When a new device is detected on zone bus 318, the connected zone coordinator 308 can automatically retrieve the equipment model from the device if the device stores its own equipment model. If the device does not store its own equipment model, the connected zone coordinator 308 can retrieve a list of point values provided by the device.

Zone coordinator 308 can incorporate the new zone bus device into the zoning logic and can inform system manager 202 that a new zone bus device has been added. For example, zone coordinator 308 is shown providing a field device list to system manager 202. The field device list can include a list of devices connected to zone bus 318 and/or SA bus 266. System manager 202 can use the field device list and the list of system bus devices to generate a device tree including all of the devices in BMS 200. In some embodiments, zone coordinator 308 provides an equipment model for a connected zone bus device to system manager 202. System manager 202 can then use the equipment model and/or list of point values for the new zone bus device to present information about the new zone bus device to a user.

In some embodiments, the device list generated by each zone coordinator 308 indicates whether system manager 202 should communicate directly with the listed zone bus device (e.g., VAV RTU 222, VAV zone controller 224, etc.) or whether system manager 202 should communicate with the intermediate zone coordinator 308 on behalf of the zone bus device. In some embodiments, system manager 202 communicates directly with zone bus devices that provide their own equipment models, but communicates with the intermediate zone coordinator 308 for zone bus devices that do not provide their own equipment model. As discussed above, the equipment models for zone bus devices that do not provide their own equipment model can be generated by the connected zone coordinator 308 and stored within the zone coordinator 308. Accordingly, system manager 202 may communicate directly with the device that stores the equipment model for a connected zone bus device (i.e., the zone bus device itself or the connected zone coordinator 308).

The active node table 330 for SA bus 266 can be stored within zone controller 322. In some embodiments, active node table 330 is part of the SA bus datalink 328 (e.g., a MSTP datalink) used by zone controller 322 to communicate via SA bus 266. Zone controller 322 can subscribe to changes in value of the active node table 330 and can receive a notification (e.g., from SA bus datalink 328) when a change in active node table 330 occurs. In response to a notification that a change to active node table 330 has occurred, zone controller 322 can read active node table 330 to identify some or all of the devices connected to SA bus 266. In some embodiments, active node table 330 identifies only the SA bus devices participating in the token passing ring via SA bus 266 (e.g., MSTP master devices). Zone controller 322 can include an additional net sensor plug and play (NsPnP) 324 configured to detect SA bus devices that do not participate in the token passing ring (e.g., MSTP slave devices).

In some embodiments, NsPnP 324 is configured to actively search for devices connected to SA bus 266 (e.g., networked sensors 238, actuators 332, lighting controllers 334, etc.). For example, NsPnP 324 can send a "ping" to a preconfigured list of MSTP slave MAC addresses. For each SA bus device that is discovered (e.g., responds to the ping), NsPnP 324 can dynamically bring it online. NsPnP 324 can bring a device online by creating and storing an instance of a SA bus device object representing the discovered SA bus device. NsPnP 324 can automatically populate the SA bus device object with all child point objects needed to collect and store point data (e.g., sensor data) from the newly discovered SA bus device. In some embodiments, NsPnP 324 automatically maps the child point objects of the SA bus device object to attributes of the equipment model for zone controller 322. Accordingly, the data points provided by the SA bus devices can be exposed to zone coordinator 308 and other devices in BMS 200 as attributes of the equipment model for zone controller 322.

In some embodiments, a detector object 326 of zone controller 322 generates a list of the devices connected to SA bus 266 (i.e., a device list) based on active node table 330 and stores the device list within zone controller 322. NsPnP 324 can update the device list to include any SA bus devices discovered by NsPnP 324. The device list generated by zone controller 322 can include information about each device connected to SA bus 266 (e.g., device type, device model, device ID, MAC address, device attributes, etc.). When a new device is detected on SA bus 266, zone controller 322 can automatically retrieve the equipment model from the device if the device stores its own equipment model. If the device does not store its own equipment model, zone controller 322 can retrieve a list of point values provided by the device.

Zone controller 322 can incorporate the new SA bus device into the zone control logic and can inform zone coordinator 308 that a new SA bus device has been added. Zone coordinator 308 can then inform system manager 202 that a new SA bus device has been added. For example, zone controller 322 is shown providing a SA device list to zone coordinator 308. The SA device list can include a list of devices connected to SA bus 266. Zone coordinator 308 can use the SA device list and the detected zone bus devices to generate the field device list provided to system manager 202. In some embodiments, zone controller 322 provides an equipment model for a connected SA bus device to zone coordinator 308, which can be forwarded to system manager 202. System manager 202 can then use the equipment model and/or list of point values for the new SA bus device to present information about the new SA bus device to a user. In some embodiments, data points provided by the SA bus device are shown as attributes of the zone controller 322 to which the SA bus device is connected.

Additional features and advantages of BMS 200, system manager 202, zone coordinator 308, and zone controller 322 are described in detail in U.S. patent application Ser. No. 15/179,894 filed Jun. 10, 2016, the entire disclosure of which is incorporated by reference herein.

Universal Serial Bus (USB) Building Devices

Figure 4:
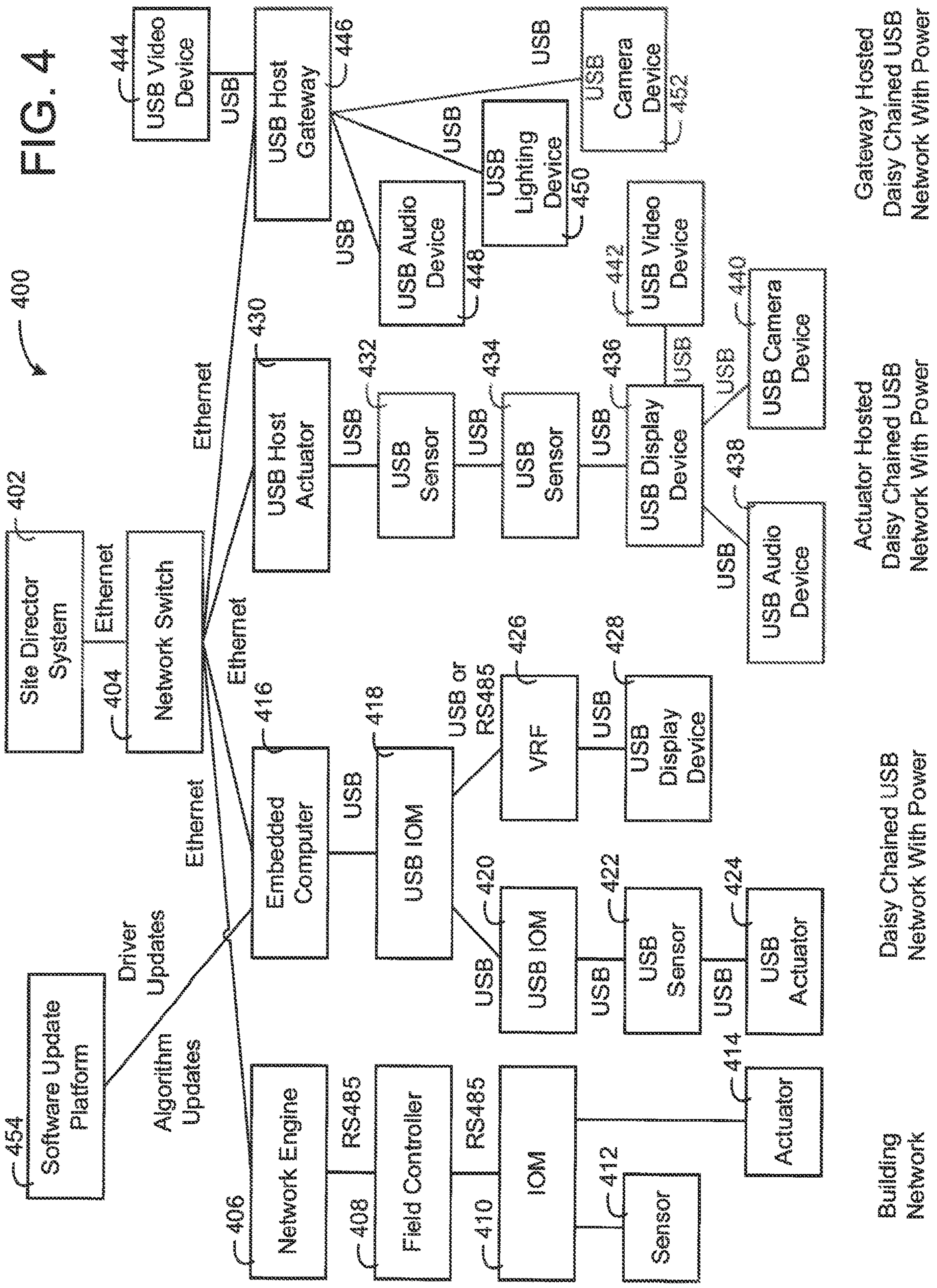
FIG. 4 is a block diagram of a BMS network including USB devices, according to an exemplary embodiment.

Referring now to FIG. 4, a system 400 of building devices networked together is shown, according to an exemplary embodiment. The system 400 includes a site director system 402. The site director system 402 can be an on-premises and/or off-premises (e.g., a hybrid system) configured to make high level operational decisions for a building, e.g., the building 10 as described with reference to FIG. 1. In some embodiments, the system 400 is completely on-premises to reduce security risks. The site director system 402 can include one or more processing circuits and/or connected devices. The site director system 402 can be an application and data server (ADS) and/or an extended application and data server (ADX)

The site director system 402 may be an NxE/SNx. For example, building optimization algorithms, high level environmental building control, etc. can be performed by the site director system 402. The site director system 402 can communicate to lower level building devices of the system 400 through a network switch 404 (e.g., an Ethernet switch). The site director system 402 can be configured to communicate with the lower level building devices via Ethernet, e.g., an Ethernet connection between the site director system 402 and the network switch 404 and additional Ethernet connections between the network switch 404 and a network engine 406, an embedded computer 416, a USB host actuator 430, and a USB host gateway 446.

In some embodiments, the Ethernet provides power, i.e., power over Ethernet (PoE) to the embedded computer 416, the USB host actuator 430, and/or the USB host gateway 446. In this regard, the embedded computer 416, the USB host actuator 430, and/or the USB host gateway 446 can be powered via PoE. Furthermore, the USB connections to the embedded computer 416, the USB host actuator 430, and/or the USB host gateway 446 are powered over USB where the original source of power is PoE from the network switch 404, where the network switch 404 is a PoE power source. In some embodiments, the peripheral building USB devices connected to the embedded computer 416, the USB host actuator 430, and/or the USB host gateway 446 communicate and/or are powered via PoE instead of, or in addition to, the USB connections. PoE is described in greater detail in U.S. Provisional Patent Application No. 62/852,582 filed May 24, 2019, and U.S. Provisional patent application Ser. No. 15/956,914 filed Apr. 19, 2019, the entireties of which are incorporated by reference herein.

The network engine 406 can be configured to facilitate communication between the site director system 402 via a first network protocol (e.g., via Ethernet) and a second network protocol (e.g., via RS485 and/or protocols such as BACnet, CAN, etc.). The network engine 406 may be a Network Automation Engine (NAE). The network engine 406 can be configured to facilitate communicate for the RS485 bus and communication for various controllers, thermostats, and/or any other device configured to communicate via RS485. For example, one device configured to communicate via the RS485 bus is the field controller 408. The field controller 408 can be configured to make control decisions for the actuator 414. In some embodiments, the field controller 408 may make control decisions for the actuator 414 via measurements of a sensor, e.g., the sensor 412. In some embodiments, the sensor 412 and the actuator 414 are part of a system. The system may be an environmental lighting system, a temperature control system, an air handler unit (AHU), a variable air volume (VAV) unit, a chiller system, and/or any other system. The sensor 412 can be configured to measure occupancy, light level, temperature, humidity, air pressure, air flow, sound, and/or any other environmental building condition. The actuator 414 can be a damper, a motor, a valve, a light system, a speaker, and/or any other electrical and/or electromechanical device configured to operate to control an environmental condition of a building.

The field controller 408 may not have a direct interface to the sensor 412 and/or the actuator 414 (or may not be located near the sensor 412 and/or the actuator 414). In this regard, control decisions and/or readings of the sensor 412 and/or the actuator 414 can be communicated between the field controller 408 and the sensor 412 and/or the actuator 414 via the IOM 410. The IOM 410 can be configured to communicate with the field controller 408 via RS485 but may also include direct inputs and/or outputs to the sensor 412 and/or the actuator 414. For example, the IOM 410 can receive a control command from the field controller 408 and, via the physical connection to the actuator 414, command the actuator 414 on behalf of the field controller 408. Similarly, the IOM 410 can receive sensor readings from the sensor 412 via a physical connection between the IOM 410 and the sensor 412 and communicate the sensor readings to the field controller 408 via the RS485 connection.

Instead of (or in addition to) including the network engine 406 and the field controller 408, the system 400 can include the embedded computer 416. The embedded computer 416 can be configured to communicate with the site director system 402 via the Ethernet connection and can be configured to communicate with peripheral building devices, i.e., lower level building devices, via a USB connection. In some embodiments, the embedded computer 416 is a small form factor embedded computer, e.g., a computer without a fan. In some embodiments, the other types of computers, i.e., non-embedded computers, can be utilized instead or, or in addition to, the embedded computer 416. For example, the computers could be a laptop computer, a desktop computer, and/or any other computer. The embedded computer 416 can be a PC running Windows, Linux, etc. The embedded computer 416 can be an Open Application Server (OAS) PC (e.g., an embedded PC running server software) and/or an N50 PC (e.g., an embedded PC running "N50" software, i.e., NCE software). In some embodiments, because the embedded computer 416 is fan-less, it does not rely on the fan operating, i.e., in some computer systems if the fan fails the computer system may stop operating and controlling the peripheral USB building devices.

The embedded computer 416 can be configured to generate control decisions. The embedded computer 416 can, via the USB connection, communicate the control decisions to the peripheral USB devices via the USB connection. For example, the embedded computer 416 can be configured to run a control algorithm (e.g., an HVAC algorithm, a lighting algorithm, etc.) and communicate control commands resulting from the control algorithm to the appropriate peripheral USB building devices via the USB connection. The peripheral USB building devices can be sensors, actuators, thermostats, IOMs, lighting systems, audio systems, surveillance systems, badge access systems, door locks, etc. The USB building devices can be automatically discovered and enumerated as they join the network. Furthermore, in some embodiments, the embedded computer 416 can receive sensor readings (or other feedback data) from the peripheral USB building devices can perform the control algorithms based on the sensor readings. In some embodiments, the embedded computer 416 performs the control algorithms based on high level settings received via the Ethernet connection from the site director system 402.

The embedded computer 416 may not include physical connections to sensors and/or actuators and may not directly control the sensors and/or actuators. In this regard, the embedded computer 416 may be connected to a USB IOM 418. The USB IOM 418 may be similar to the IOM 410 but may communicate with the embedded computer 416 an, via physical connections, instantiate control decisions of the embedded computer 416 received from the embedded computer 416 via the USB connection.

The USB IOM 418 can be connected to other peripheral USB building devices and/or systems. For example, the USB IOM 418 can be configured to facilitate an RS485 network (e.g., BACnet, CAN, etc.) In this regard, the USB IOM 418 can facilitate communication between the embedded computer 416 and a variable refrigerant flow (VRF) 426. Furthermore, the USB IOM 418 can be daisy chained via USB with other peripheral USB building devices. For example, the USB IOM 418 can facilitate a connection between the embedded computer 416 and another USB IOM 420, a USB sensor 422, and/or a USB actuator 424. The USB IOM 420 can be similar to the USB IOM 418 but expand the physical output of the USB IOM 418. The USB sensor 422 and/or the USB actuator 424 can be similar to the sensor 412 and the actuator 414 but perform communication directly to the embedded computer 416 via USB.

In some embodiments, the peripheral USB building devices are daisy chained via USB. For example, the USB IOM 420 can be connected via USB to the USB IOM 418, the USB sensor 422 can be connected to the USB IOM 420 via USB, and the USB actuator 424 can be connected to the USB sensor 422. All of the peripheral USB building devices can communicate back through the daisy chain to the embedded computer 416. In some embodiments, the VRF 426 includes, and/or is associated with, a display screen daisy chained via USB. For example, the VRF 426 can be connected to a display device 428 via a USB connection. The embedded computer 416 can facilitate the implementation of any control decisions for the VRF 426 received from a user via the display device 428. The display device 428 can include a liquid crystal display (LCD), a light emitting diode (LED) display, and/or any other display device.

In some embodiments, a USB host actuator 430 (or sensor) can facilitate communication between the site director system 402 via Ethernet and peripheral USB building devices via USB. In this regard, the USB host actuator 430 may be similar to the actuator 414 but may be configured to facilitate multiple network connections, e.g., communicate via Ethernet and perform USB host operations for peripheral USB building devices. The USB host actuator 430 can be a network variable air volume modular assembly (VMA) and/or a network VAV. The site director system 402 can be configured to perform the control algorithms of the embedded computer 416 and communicate the control decisions directly to the peripheral USB building devices via the USB host actuator 430. The USB peripheral devices can use a less powerful processor since the embedded computer 416 handles most of the processing.

The peripheral USB building devices can be daisy chained together to the USB host actuator 430. A USB sensor 432 can be directly connected to the USB sensor 432 via a USB connection while a USB sensor 434 can be connected to the USB sensor 432 via another USB connection. The USB sensor 432 and the USB sensor 434 can be the same as, or similar to, the USB sensor 422. Furthermore, a USB display device 436 can be connected to the USB sensor 434 via USB. The USB display device 436 can be the same as or similar to the USB display device 428. The USB display device 436 can include multiple USB connections connecting a USB audio device 438 via a first USB connection, a USB video device 442 via a second USB connection, and a USB camera device 440 via a third USB connection.

The USB video device 442 can be a projector system, a smart whiteboard, a smart television, etc. The USB audio device 438 can be a speaker and/or microphone implementing, or providing input and output for, a smart assistant (e.g., CORTANA, SIRI). Examples of building audio controlled assistants may be the conversational assistants described in U.S. patent application Ser. No. 16/028,126 filed Jun. 5, 2018, and U.S. patent application Ser. No. 16/246,391 filed May 16, 2019, the entirety of which are incorporated by reference herein. In some embodiments, HDMI data streams can be carried from the network (e.g., from a personal computer connected to the network switch 404 and/or from the site director system 402) to the USB video device 442 and the USB video device 442 can be configured to display the HDMI data. Furthermore, the USB camera device 440 can be a surveillance camera. The USB display device 436, the USB video device 442, the USB audio device 438, and/or the USB camera device 440 can communicate and be managed via the site director system 402 through the USB host actuator 430.

In some embodiments, the system 400 includes a USB host gateway 446. The USB host gateway 446 can be a box configured to perform gateway operations for peripheral USB building devices. The USB host gateway 446 can be configured to communicate with the site director system 402 via an Ethernet connection and further include one or multiple USB connections for connecting USB devices to the site director system 402. For example, the USB host gateway 446 can connect to a USB audio device 448, a USB lighting device 450, and a USB camera device 452. The USB audio device 448 can be the same as or similar to the USB audio device 438. The USB camera device 452 can be the same as or similar to the USB camera device 440. The USB lighting device 450 can be a lighting system configured to generate light, e.g., an incandescent lamp, a compact fluorescent lamp, a light emitting diode (LED), etc. In this regard, the USB connection can carry control data, collected building data, audio data, video data, etc.

The USB connections of the system 400 can be any type of USB connection. For example, USB-A, USB-B, USB-C, mini-USB, micro-USB, etc. In some embodiments, the USB connections are USBC/USB 3.x, USB 4.x. In some embodiments, the USB connections are configured to carry power. In this regard, the peripheral USB building devices can be partially and/or fully powered via USB. For example, the embedded computer 416 can power the USB IOM 418, the USB IOM 420, the USB sensor 422, the USB actuator 424, the VRF 426, and/or the USB display device 428 in full and/or or in part via USB. Similarly, the USB host actuator 430 can power the USB sensor 432, the USB sensor 434, the USB display device 436, the USB video device 442, the USB audio device 438, and/or the USB camera device 440 in full or in part via USB. Furthermore, the USB host gateway 446 can power the USB audio device 448, the USB lighting device 450, the USB camera device 452, and/or the USB video device 444. In some embodiments, one or multiple of the peripheral USB building devices require a greater power than is available via USB, such USB building devices may be connected to both a building power source and the USB connection.

In some embodiments, one or multiple of the peripheral building USB devices and/or USB host devices (e.g., the embedded computer 416, the USB host actuator 430, and/or the USB host gateway 446) can include power injection. In this regard, a permanent and/or battery source can extend the length of the USB daisy chain increasing the number of devices connected via USB in the system 400. Furthermore, one or multiple of the peripheral building USB devices and/or USB host devices can be USB hubs allowing for the connection of multiple USB devices directly to the USB hub. For example, in some embodiments, the USB display device 428, the USB display device 436, and/or the USB host gateway 446 include a USB hub and/or a USB power injector.

In some embodiments, the USB hosts, e.g., the embedded computer 416, the USB host actuator 430, and/or the USB host gateway 446 are configured with driver software for managing the peripheral USB building devices. In some embodiments, when a peripheral USB building device is connected to a USB host, the USB host is configured to enumerate and configure the peripheral USB building device. Furthermore, via manual intervention, local storage, or retrieval from a remote system, e.g., software update platform 454, the USB host can install a driver for managing the peripheral USB device. Furthermore, control algorithm information can be configured to operating the peripheral USB building device. The control algorithm can be local on the USB host, stored in the software update platform 454, and/or stored on the site director system 402. In some embodiments, the USB host retrieves and/or receives the algorithm and operates the peripheral USB building device based on the control algorithm.

Figure 5:
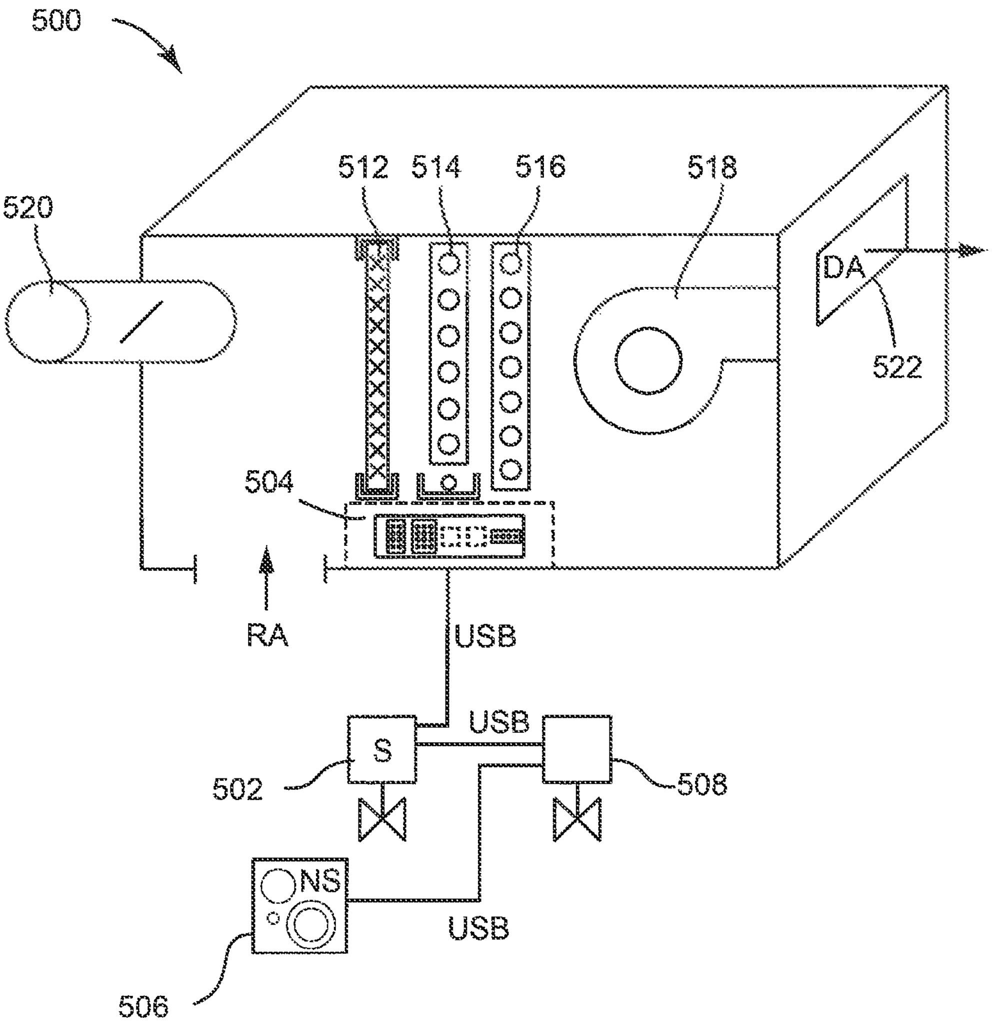
FIG. 5 is a block diagram of USB sensor and actuator devices in an air handling unit (AHU), according to some embodiments.

Referring now to FIG. 5, a block diagram of an implementation of peripheral USB building devices in an air handling unit (AHU) 500 is depicted, according to some embodiments. The peripheral USB building devices can be peripheral devices connected to a host device, e.g., the AHU 500. In this regard, a computer system of the AHU 500 (e.g., the embedded computer 416 and/or the USB host gateway 446) can act as a host to receive information from, and operate, via USB, the peripheral USB building devices. The embedded computer 416 can be configured to perform one or more control decision for the AHU 500 via the communication with the peripheral USB devices connected to the embedded computer 416. In some embodiments, the peripheral USB building devices and the AHU 500 are sold to an end user as a package, i.e., a system suite. Other similar packages of systems may exist for VAVs, chillers, boilers RTUs, etc. This enables a user to purchase a particular equipment package including peripheral USB building devices and daisy chain the peripheral USB building devices together to install the networking aspects of the package. Furthermore, the USB peripheral device is an inexpensive device since the processing work has been transferred to the embedded computer 416.

The AHU 500 is shown to include an actuator device 502 connected to a junction board 504 via a USB connection. The junction board 504 may be a small two-sided junction board that protrudes through the side of the electrical cabinet of the AHU 500. In addition to the USB actuator device 502, the junction board 504 may be connected to a USB network sensor 506 and a hot water valve driven by a USB actuator 508 via USB connections, more specifically, a daisy chain of USB devices. The USB network sensor 506 may be a USB thermostat, in some embodiments.

The AHU 500 is further shown to include a filter 512, a chilled water coil 514, a hot water coil 516, and a fan 518 within the AHU electrical cabinet. The chilled water coil 514 may be controlled by the USB actuator device 502, while the hot water coil 516 may be controlled by a hot water valve 508. In some embodiments, the AHU 500 may be supplied by outdoor air that is controlled via outdoor air damper 520. Outdoor air may pass through the filter 512 and past the chilled water coil 514 and the hot water coil 516 before exiting the AHU discharge via the fan 518. In some embodiments, the AHU 500 includes a discharge air temperature sensor 522. Measurements from discharge air temperature sensor 522 may be provided to the USB actuator device 502 and/or the embedded computer 416 which may be located within the AHU 500 and/or external to the AHU 500 and connected via the USB connections shown connecting to the junction board 504. The operation of the chilled water coil 514 and the hot water coil 516 may be adjusted by the USB actuator device 502 and the hot water valve 508 (or the embedded computer 416) based on the discharge temperature feedback from the sensor 522. Examples of smart actuator systems and networked systems are described in greater detail in U.S. patent application Ser. No. 15/901,843 filed Feb. 21, 2018, U.S. patent application Ser. No. 15/399,706 filed Jan. 5, 2017, U.S. patent application Ser. No. 15/685,924 filed Aug. 24, 2017, U.S. patent application Ser. No. 15/901,852 filed Feb. 21, 2018, and U.S. patent application Ser. No. 15/399,706 filed Jan. 5, 2017, the entirety of each of which is incorporated by reference herein.

Figure 6:
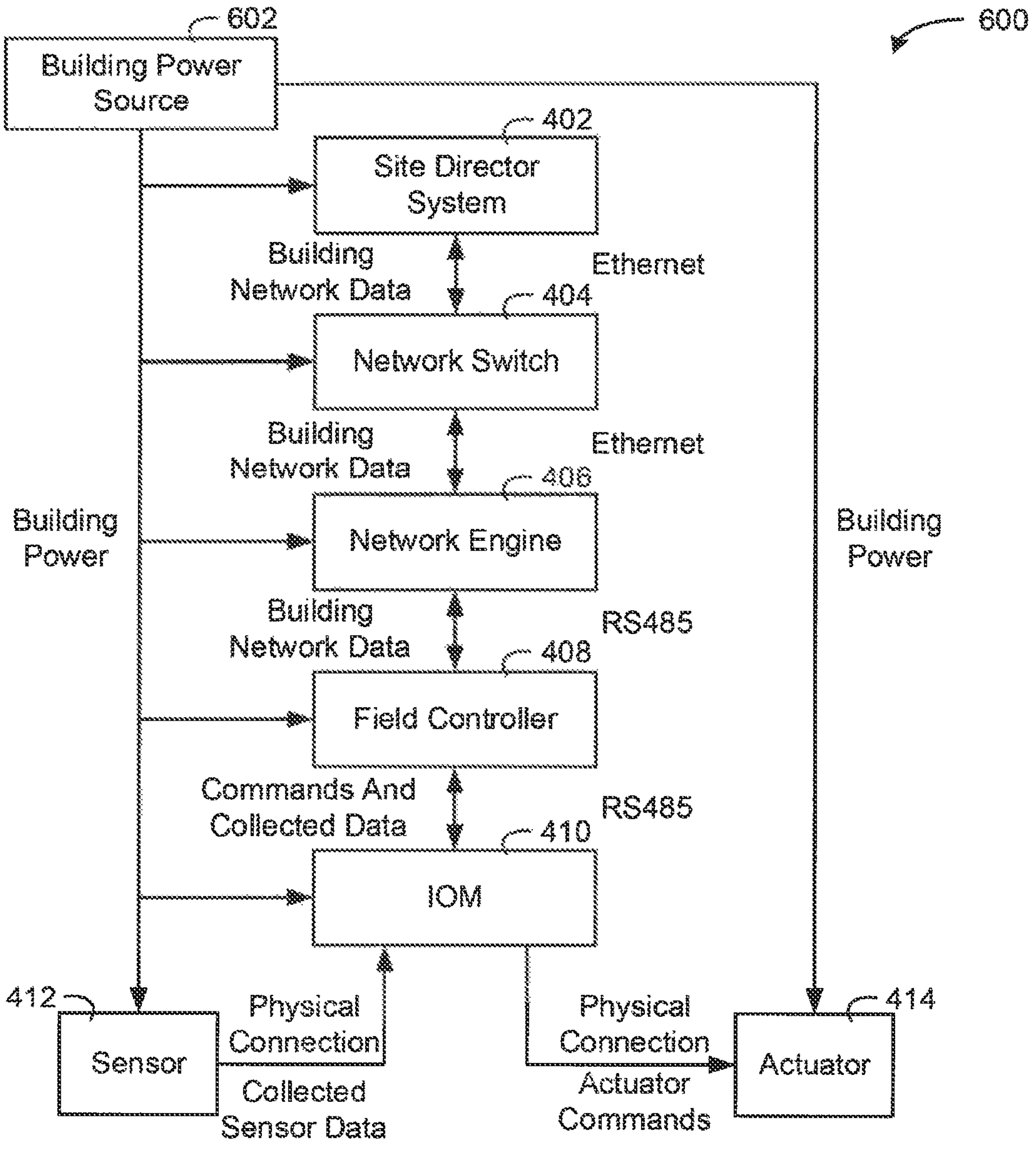
FIG. 6 is a block diagram of a BMS network with building power, according to an exemplary embodiment.

Referring now to FIG. 6, a system 600 including various systems and devices of FIG. 4 is shown, according to an exemplary embodiment. The system 600 is shown to include the site director system 402, the network switch 404, the network engine 406, the field controller 408, the IOM 410, the sensor 412, and the actuator 414. Building network data is communicated among the site director system 402, the network switch 404, the network engine 406, and/or the field controller 408. The network data can be communicated via Ethernet and/or RS485 connections and can be high level control information. Collected data and operational commands can be generated by the field controller 408 and communicated to the IOM 410. The IOM 410 can, via physical connections to the sensor 412 and/or the actuator 414, collect information and implement physical control.

The system 600 is shown to include a building power source 602. The building power source 602 can include a building transformer, building power outlets, etc. Each of the site director system 402, the network switch 404, the network engine 406, the field controller 408, the IOM 410, the sensor 412, and the actuator 414 can be powered via building power of the building power source 602. In this regard, if building power is to fail, the system 600 may become unresponsive as systems and devices of the system 600 may turn off. Furthermore, when installing the system 600 in a building, e.g., the building 100 as described with reference to FIG. 1, the systems and devices of the system 600 may need to be installed in locations where network wiring (e.g., Ethernet and/or RS485 connections) can exist in addition to power outlets. However, with a USB communicating system, e.g., as described in FIGS. 4 and 7, power can be transmitted via USB connections.

Figure 7:
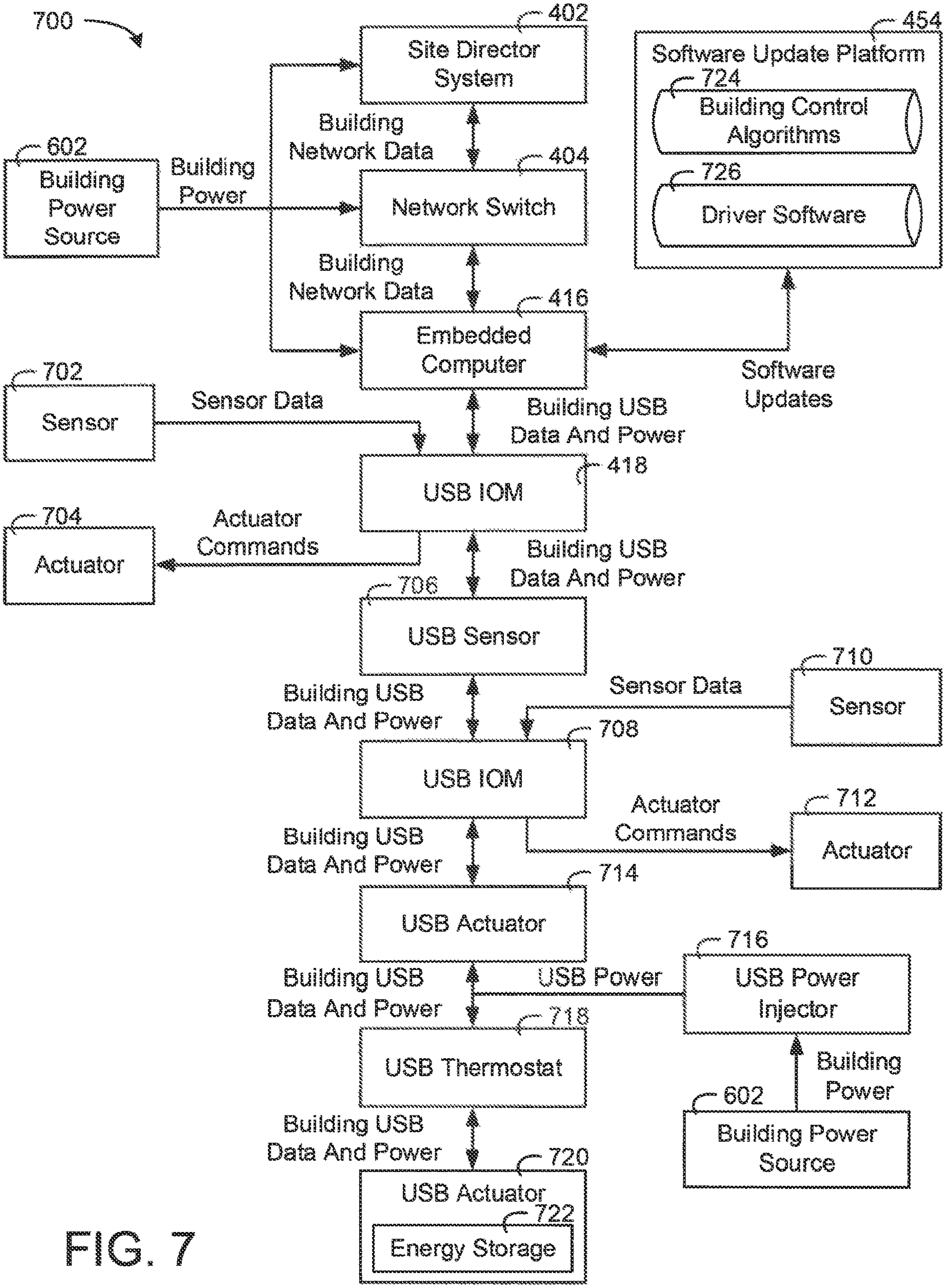
FIG. 7 is a block diagram of a BMS network with USB peripheral building devices and an embedded computer configured to manage and power the USB peripheral building devices, according to an exemplary embodiment.

Referring now to FIG. 7, a system 700 is shown including peripheral USB devices powered via USB connections, according to an exemplary embodiment. The system 700 includes the building power source 602 as described with reference to FIG. 6 and the site director system 402, the network switch 404, and the embedded computer 416 as described with reference to FIG. 4. The site director system 402, the network switch 404, and the embedded computer 416 are shown to operate based on the building power supplied by the building power source 602.

The embedded computer 416 can be configured to operate as a USB host for the peripheral USB building devices daisy chained to the embedded computer 416. The embedded computer 416 communicates with the software update platform 454. The software update platform can be configured to store building control algorithms 724 and/or driver software 726. In response to a new peripheral USB building device being connected via a USB connection to the embedded computer 416, either directly or indirectly via a USB daisy chain, the embedded computer 416 can be configured to automatically install driver software to operate the new peripheral USB building device and any control algorithm required to run to operate the device. In some embodiments, the driver software and/or control algorithms are stored locally on the new peripheral USB building device and, the embedded computer 416 can receive the driver software and/or control algorithms from the new peripheral USB building device via the USB connection. In some embodiments, the driver and/or control software is stored locally within the embedded computer 416, and in this regard, the embedded computer 416 can be configured to appropriately configure the local driver and/or control software for operation. The USB devices can have enumeration and automatic configuration as part of the operation of the system.

In some embodiments, the embedded computer 416 can retrieve the control algorithm and/or driver software from a remote system, i.e., from the software update platform 454. In this regard, via a network, e.g., the Internet, Wi-Fi, an on-premises local area network (LAN), etc. the embedded computer 416 can communicate with the software update platform 454, request a new driver and/or control algorithm, and/or receive the new driver and control algorithms for installation on the embedded computer 416.

The USB IOM 418 is shown to communicate building USB data and receive power via a USB connection to the embedded computer 416. The USB IOM 418 is further shown to include physical connections to a sensor 702 and an actuator 704. Based on control decisions made by the embedded computer 416 and communicated to the USB IOM 418, the USB IOM 418 can control the actuator 704 and collect data from the sensor 702 which can be communicated back to the embedded computer 416 via the USB connection. The sensor 702 can be the same as or similar to the sensor 412 as described with reference to FIG. 4 while the actuator 704 can be the same as or similar to the actuator 414 as described with reference to FIG. 4.

A USB sensor 706 is shown to be daisy chained to the USB IOM 418 which can communicate to the embedded computer 416 and receive USB power from the embedded computer 416, indirectly through the USB IOM 418. The USB sensor 706 can collect environmental sensor data while powered via the USB power and communicate the collected sensor data to the embedded computer 416 via the USB connection. The USB sensor 706 may be the same as or similar to the USB sensor 422 as described with reference to FIG. 4.

Similarly, a second USB IOM 708 is included within the system 700 with associated sensor 710 and actuator 712. The USB IOM 708 can be daisy chained to the USB sensor 706. The USB IOM 708, the sensor 710, and the actuator 712 can be similar to the USB IOM 418, the sensor 702, and the actuator 704. Furthermore, USB actuator 714 can be daisy chained to the USB IOM 708. The USB actuator 714 can be the same as or similar to the USB actuator 414 as described with reference to FIG. 4.

Furthermore, a USB thermostat 718 can be daisy chained to the USB actuator 714. The USB thermostat 718 can, in some embodiments, receive an environmental setpoint from a user and communicate the environmental setpoint to the embedded computer 416 where the embedded computer 416 determines control decisions for the system 700 via the environmental setpoint. In some embodiments, the embedded computer 416 manages the USB thermostat 718 to generate control decisions by the USB thermostat 718. For example, the embedded computer 416 can configure the USB thermostat 718 to generate a control decision for another peripheral USB device in the system 700 can communicate the control decision to the peripheral USB device via the USB connection.

A USB actuator 720 is daisy chained to the USB thermostat 718. The USB actuator 720 includes energy storage 722. The energy storage 722 can be a super capacitor, a battery (e.g., a lithium ion battery, a nickel cadmium battery, a nickel metal hydride battery, etc.), etc. The USB actuator 720 can be configured to charge the energy storage 722 via the USB power received via the USB connection to the USB thermostat 718. The USB actuator 720, in response to receive a control command from the embedded computer 416, can actuate an electromechanical actuator of the USB actuator 720 via energy stored by the energy storage 722 instead of based on USB power. The USB power may not be sufficient to power the USB actuator 720 during an actuation, however, the power of the energy storage 722 may. Charging and discharging an energy storage device is described in greater detail in FIGS. 20-21.

The system 700 is further shown to include a USB power injector 716. The USB power injector 716 can be configured to provide power to the peripheral USB devices of the system 700 such that the number of peripheral USB building devices, and the distance over which the peripheral USB building devices are wired, is extended. The USB power injector 716 can be a standalone device powered via the building power source 602 and/or can be integrated within one or multiple of the peripheral USB building devices of the system 700 and/or the embedded computer 416.

Figure 8:
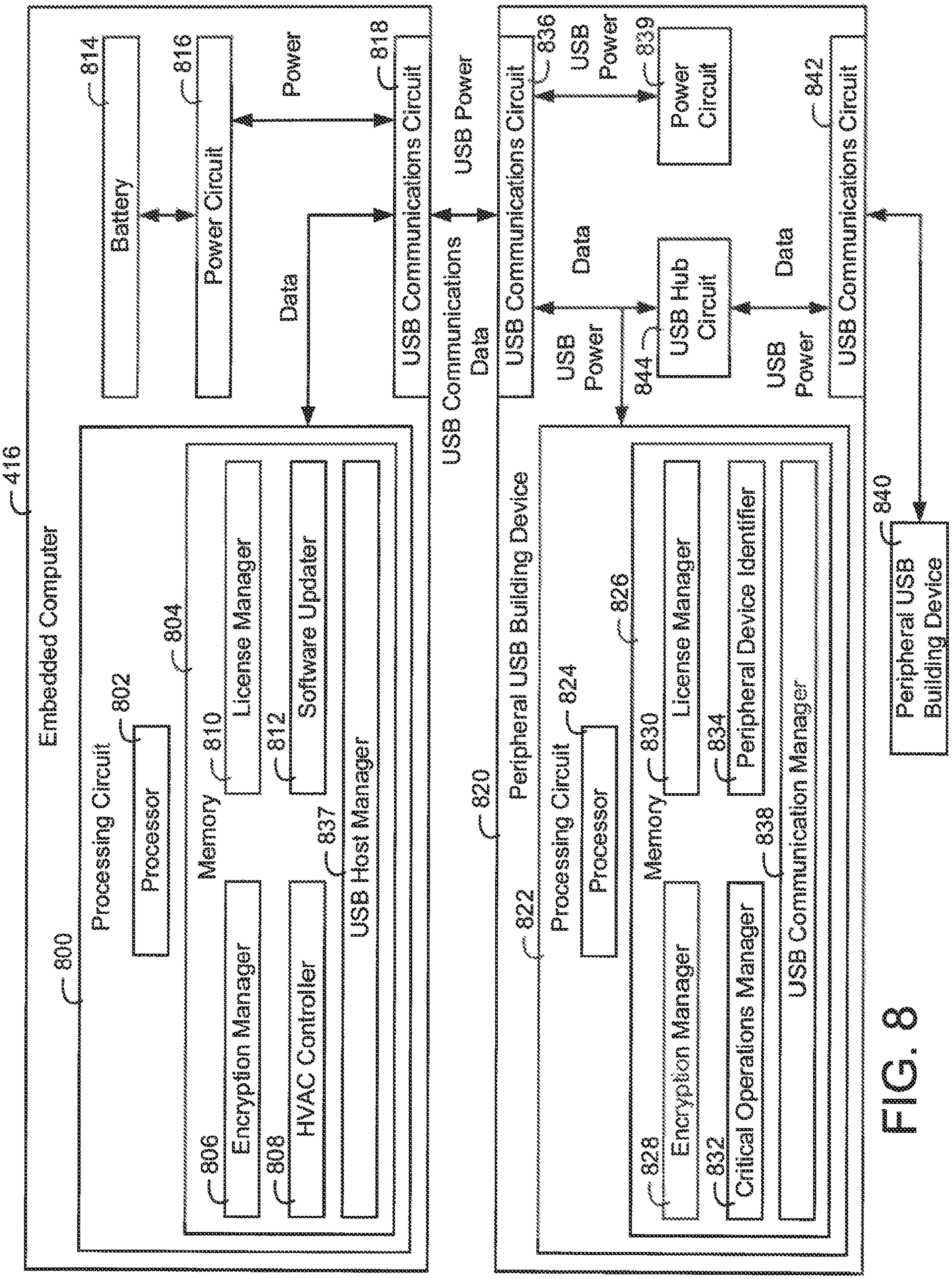
FIG. 8 is a block diagram of the embedded computer and one of the USB peripheral building devices shown in greater detail, according to an exemplary embodiment.

Referring now to FIG. 8, the embedded computer 416 and a USB peripheral building device 820 are shown, according to an exemplary embodiment. The embedded computer 416, as described with reference to FIG. 4, is shown to include a processing circuit 800, a battery 814, a power circuit 816, and a USB communications circuit 818. The USB host actuator 430 and/or the USB host gateway 446 can include the same or similar components as the embedded computer 416.

The processing circuit 800 includes a processor 802 and a memory 804. The processor 802 can be a general purpose processor, an application specific integrated circuit (ASIC), one or more field programmable gate arrays (FPGAs), a group of processing components, or other suitable electronic processing components. The processor 802 can be communicatively coupled to the memory 804. The memory 804 can include one or more devices (e.g., memory units, memory devices, storage devices, etc.) for storing data and/or computer code for completing and/or facilitating the various processes described in the present disclosure. The memory 804 can include random access memory (RAM), read-only memory (ROM), hard drive storage, temporary storage, non-volatile memory, flash memory, optical memory, or any other suitable memory for storing software objects and/or computer instructions. The memory 804 can include database components, object code components, script components, or any other type of information structure for supporting the various activities and information structures described in the present disclosure. The memory 804 can be communicably connected to the processor 230 via the processing circuit 800 and can include computer code for executing (e.g., by the processor 802) one or more processes described herein.

The battery 814 can be a lithium-ion (Li-ion) battery, a nickel cadmium (Ni-Cd), a nickel-metal hydride (Ni-MH) battery, a lead-acid battery, and/or any other type of energy storage device configured to store and discharge energy. The power circuit 816 can be configured to power the embedded computer 416. The power circuit 816 can be configured to power the embedded computer 416 via building power received from a building power source (e.g., the building power source 602) and/or the battery 814. The power circuit 816 can further be configured to charge the battery 814 via the building power. The power circuit 816 can include filter circuits, transformers, buck converters, and/or any other circuit configured to power the embedded computer 416. In some embodiments, the embedded computer 416 does not include the battery 814 and is powered directly from building power.

The USB communications circuit 818 can be configured to facilitate USB communication between the embedded computer 416 and the USB peripheral building device 820. The USB communications circuit 818 may be a physical interface including one or more transceiver circuits, connectors, etc. The USB communications circuit 818 may provide USB power to the USB peripheral building device 820 based on power received from the power circuit 816. The USB communications circuit 818 can be configured to implement USB-A, USB-B, USB-C, mini-USB, micro-USB, etc.

The memory 804 includes an encryption manager 806. The encryption manager 806 can be configured to encrypt information transmitted from the embedded computer 416 to the USB peripheral building device 820. The encryption manager 806 can perform Rivest-Shamir-Adleman (RSA) encryption, elliptic-curve cryptography (ECC), and/or any other type of encryption algorithm to encrypt the information transmitted to the USB peripheral building device. Furthermore, the encryption manager 806 can be configured to decrypt information encrypted by the USB peripheral building device 820. In this regard, to perform the encryption and/or decryption, the encryption manager 806 can store one or more secret pieces of information, one or more public keys associated with the embedded computer 416, one or more private keys associate with the embedded computer 416, one or more public keys of the USB peripheral building device 820 (e.g., communicated to the embedded computer 416 from the USB peripheral building device 820 via the USB connection), and/or one or more secrets associated with the USB peripheral building device 820.

The memory includes a license manager 810. The license manager 810 can be configured to perform licensing operations for the embedded computer 416. For example, the license manager 810 can enable or disable one or more operations of the embedded computer 416 based on whether an end user has a license to the one or more operations. For example, a particular control algorithm (e.g., an advanced energy savings application) may only be available to a user if the user has purchased a license for the control algorithm. Similarly, particular metrics that the embedded computer 416 can be configured to generate may only be available for review by an end user if the end user has a license for the metrics. The embedded computer 416 can receive licensing information from a licensing server. The licensing information may be a manifest as described with reference to U.S. patent application Ser. No. 15/639,880 filed Jun. 30, 2017, the entirety of which is incorporated by reference herein.

In some embodiments, the licenses enforced by the license manager 810 are based on license data received from the USB peripheral building device 820. For example, the USB peripheral building device 820 can be purchased by a user where the user pays for a particular feature for the USB peripheral building device 820, e.g., an energy savings feature adjusting the operation of the USB peripheral building device 820 to control environmental conditions of a building efficiently, an occupancy prediction feature based on sensor readings of the USB peripheral building device 820, etc. The license information can be stored on the USB peripheral building device 820 and pushed, via the USB connection between the embedded computer 416 and the USB peripheral building device 820, to the embedded computer 416. The license manager 810 can be configured to implement (e.g., enforce) the received license to perform the one or more operations that the user is licensed for. Enforcing the license can include enabling one or more operations or disabling one or more operations.

The memory 804 includes an HVAC controller 808. The HVAC controller 808 can be configured to perform one or more control algorithms based on collected data of a particular USB peripheral building device (e.g., the USB peripheral building device 820 and/or any other device) and generate one or more control decisions for a particular USB peripheral building device (e.g., the USB peripheral building device 820 and/or any other device). In some embodiments, the HVAC controller 808 performs the control algorithm based on environmental sensor readings of a USB sensor and generates control decisions for a USB actuator. In other embodiments, instead of adding features to USB building devices via licensing, self-powered USB processors that can add features/algorithms may be plugged into the host directly or indirectly. For example, adding an Economizing feature by plugging in a processor such as a "gumstick" USB device with embedded processor to a USB port in the chain.

The HVAC controller 808 may use any of a variety of control algorithms (e.g., state-based algorithms, extremum-seeking control algorithms, proportional algorithms, proportional integral algorithms, PID control algorithms, model predictive control algorithms, feedback control algorithms, etc.) to determine appropriate control actions for any HVAC equipment as a function of temperature and/or humidity. For example, if the ambient temperature of a zone and/or a building (e.g., building 10) is above a temperature set point, the HVAC controller 808 may determine that a cooling coil and/or a fan should be activated to decrease the temperature of a supply air delivered to a building zone. Similarly, if the ambient temperature is below the temperature set point, the HVAC controller 808 may determine that a heating coil and/or a fan should be activated to increase the temperature of the supply air delivered to the building zone. The HVAC controller 808 may determine that a humidification or dehumidification component of the HVAC equipment should be activated or deactivated to control the ambient relative humidity to a humidity set point for a building zone and/or the building.

The memory 804 includes a software updater 812. The software updater 812 can be configured to update the software of the embedded computer 416. For example, the software updater 812 can store one or more USB drivers for peripheral USB building devices, e.g., the USB peripheral building device 820. When the peripheral USB building device 820 is connected to the embedded computer 416, based on identifying information communicated from the peripheral USB building device 820, the software updater 812 can identify the appropriate driver for the peripheral USB building device 820 based on the identifying information and install the USB driver on the embedded computer 416. In some embodiments, the embedded computer 416 receives the driver directly from the peripheral USB building device 820. In some embodiments, the software updater 812 retrieves the driver from the software update platform 454.

Furthermore, the software updater 812 can be configured to install HVAC control algorithms on the embedded computer 416, e.g., on the HVAC controller 808. For example, the HVAC controller 808 may require a specific control algorithm for operating the peripheral USB building device 820. The software updater 812 can store the HVAC algorithm and install the algorithm in response to detecting the peripheral USB building device 820 is connected to the embedded computer 416. Furthermore, in some embodiments, the software updater 812 can receive the control algorithm from the peripheral USB building device 820 and/or from the software update platform 454.

In some embodiments, the software updater 812 identifies and configures control algorithms based on equipment models, building tags, and/or relational data. For example, the software updater 812 could receive a sensor temperature tag from a senor connected via the USB communications circuit 818 and an actuator temperature control tag from an actuator connected via the USB communications circuit 818. This relational information may indicate that a control algorithm where the temperature readings of the temperature sensor should be used to control the actuator. The software updater 812 can identify this relationship via one or more rules and/or building models and implement the algorithm configuration.

Memory 804 includes a USB host manager 837. The USB host manager 837 can be configured to perform one or more host operations, e.g., enumerating devices, communicating information to the peripheral USB building device 820, receive information from the peripheral USB building device 820, etc. The USB host manager 837 can be configured to perform USB standards e.g., USB 1, USB 2, and/or USB 3, USB 4.x.

The peripheral USB building device 820 includes a processing circuit 822, a USB communications circuit 836, and a power circuit 839. USB communications circuit 836 can be the same as, or similar to the USB communications circuit 818. The USB communications circuit 836 can be configured to facilitate USB communication between the USB peripheral building device 820 and the embedded computer 416. The USB communications circuit 836 may be a physical interface including one or more transceiver circuits, connectors, etc. The USB communications circuit 836 may receive USB power from the embedded computer 416 and provide the received power to the power circuit 839. The USB communications circuit 836 can be configured to implement USB-A, USB-B, USB-C, mini-USB, micro-USB, etc.

The peripheral USB building device 820 includes a USB hub circuit 844. The USB hub circuit 844. The USB hub circuit 844 can expand an upstream port that may be physically implemented via the USB communications circuit 836 to one or multiple downstream ports physically implemented via a USB communications circuit 842 of the peripheral USB building device 820. The USB hub circuit 844 can be configured to perform downstream routing and facilitate communication for downstream devices, e.g., the peripheral USB building device 840, according to USB 1, USB 2, and/or USB 3, USB 4 standards. Furthermore, the USB hub circuit 844 can receive USB power from the power circuit 839 and power the downstream device, the peripheral USB building device 840 which in turn can act as power injectors for further downstream devices.

The USB communications circuit 842 can be the same as or similar to the USB communications circuit 836. The USB communications circuit 836 may be a physical interface including one or more transceiver circuits, connectors, etc. The USB communications circuit 836 may receive USB power indirectly from the embedded computer 416 and provide the received power to the peripheral USB building device 840. The USB communications circuit 836 can be configured to implement USB-A, USB-B, USB-C, mini-USB, micro-USB, etc.

The power circuit 839 can be configured to power the peripheral USB building device 820 based on power received from the embedded computer 416. The power circuit 839 can further power the USB hub circuit 844. The power circuit 839 can be the same as, or similar to, the power circuit 816. The power circuit 839 can include filter circuits, transformers, buck converters, and/or any other circuit configured to power the embedded computer 416.

The processing circuit 822 can be the same as, or similar to, the processing circuit 800. Furthermore, processing circuit 822 includes a processor 824 and a memory 826. The processor 824 and the memory 826 can be the same as or similar to the processor 802 and the memory 804. The memory 826 includes an encryption manager 828. The encryption manager 828 may be the same as or similar to the encryption manager 806. The encryption manager 828 can be configured to encrypt information communicated from the peripheral USB building device 820 to the embedded computer 416.

Furthermore, the encryption manager 828 can be configured to decrypt encrypted information encrypted by the embedded computer 416. The encryption manager 806 can perform Rivest-Shamir-Adleman (RSA) encryption, elliptic-curve cryptography (ECC), and/or any other type of encryption algorithm to encrypt the information transmitted to the USB peripheral building device. To perform the encryption and/or decryption, the encryption manager 828 can store one or more secret pieces of information, one or more public keys associated with the embedded computer 416 (e.g., communicated to the peripheral USB building device 820 from the embedded computer 416 via the USB connection), one or more private keys associate with the embedded computer 416, one or more public keys of the USB peripheral building device 820, and/or one or more secrets associated with the USB peripheral building device 820.

The memory 826 includes a license manager 830. The license manager 830 may store one or more data structures identifying licensed features of the peripheral USB building device 820. The licensed features can be loaded onto the peripheral USB building device 820 before deployment. The features licensed by the license manager 826 may be operations performed by the embedded computer 416. In this regard, when the peripheral USB building device 820 is first connected (or anytime the peripheral USB building device 820 is connected) to the embedded computer 416 via a USB connection, the peripheral USB building device 820 can communicate license information to the embedded computer 416.

In some embodiments, if a user purchases a new license for the peripheral USB building device 820 after the peripheral USB building device 820 is deployed, a license server can push the license to the embedded computer 416. The license can be pushed via a network, e.g., the Internet, a LAN, etc. The embedded computer 416 can push the license to the license manager 830 via the USB communications circuit 818. Responsive to receiving a new license, the license manager 830 can update stored license data of the peripheral USB building device 820.

The memory 826 includes a critical operations manager 832. The critical operations manager 832 can store one or more rules for performing critical operations. For example, if the peripheral USB building device 820 is a carbon monoxide detector and includes a carbon monoxide sensor, in addition to reporting carbon monoxide levels measured by the carbon monoxide sensor to the embedded computer 416, if carbon monoxide levels exceed a predefined level, the critical operations manager 832 may sound an alarm system (e.g., a speaker system) of the peripheral USB building device 820.

The memory 826 includes a peripheral device identifier 834. The peripheral device identifier 834 can store identifying information, e.g., building device type, identification of input points of the building device 820 (e.g., analog inputs, binary inputs, etc.), identification of output points of the peripheral USB building device 820 (e.g., analog outputs, binary outputs, etc.). The peripheral device identifier 834 can include a vendor identifier (VID) and a product identifier (PID). The identification information of the peripheral device identifier 834 can be communicated by the peripheral USB building device 820 to the embedded computer 416, enabling the embedded computer 416 to identify appropriate drivers and/or control algorithms required for operating the peripheral USB building device 820.

The memory 826 includes a USB communication manager 838. The USB communication manager 838 can cause the peripheral USB building device 820 to communicate with the embedded computer 416 according to USB 1, USB 2, and/or USB 3, USB 4 standards. The USB communication manager 838 can be configured to collect information to be reported to the embedded computer 416, e.g., collected sensor data, collected actuator data, historical operations data, fault logs, etc. Furthermore, the USB communication manager 838 can be configured to receive operational commands, e.g., actuation of an actuator, setpoint commands, etc. and cause the peripheral USB building device 820 to implement the commands.

Figure 9:
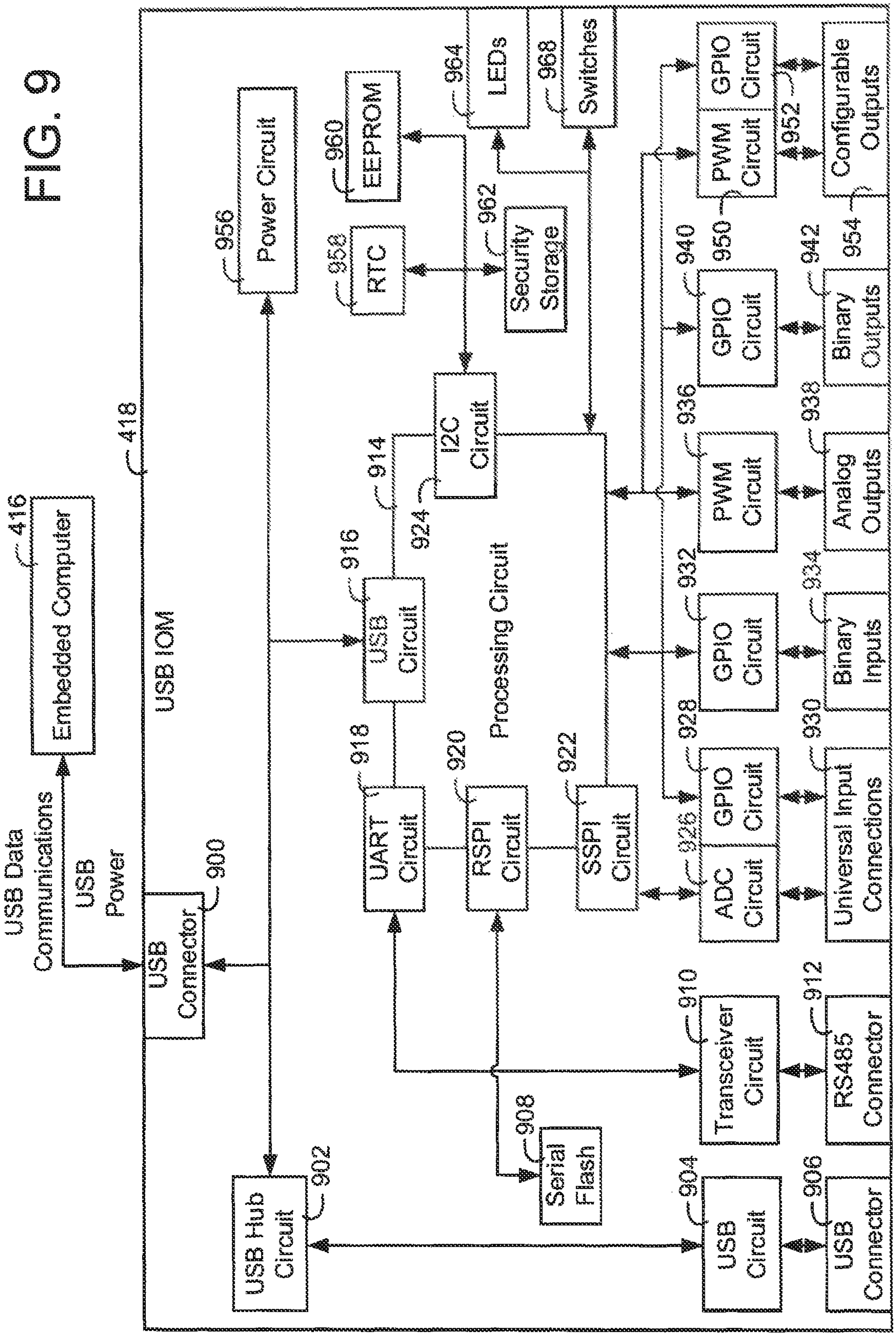
FIG. 9 is a block diagram of a USB input/output module (IOM) of the USB peripheral building devices, according to an exemplary embodiment.

Referring now to FIG. 9, the USB IOM 418 of FIG. 4 is shown in greater detail, according to an exemplary embodiment. The USB IOM 418 includes a USB connector 900. The USB connector 900 can receive USB data communications and USB power from the embedded computer 416. The USB connector 900 may be similar to the USB communications circuit 818 as described with reference to FIG. 8. The USB connector 900 can include a connector, and circuitry, for USB-A, USB-B, USB-C, mini-USB, micro-USB, etc.

The USB IOM 418 includes a USB hub circuit 902, a power circuit 956, and a processing circuit 914. The USB hub circuit 902 can be configured to expand an upstream USB connection to one or multiple downstream USB connections, i.e., to other peripheral USB building devices connected downstream from the USB hub circuit 902. The USB hub circuit 902 can perform the routing according to USB 1, USB 2, and/or USB 3, USB 4 standards. The USB hub circuit 902 can be the same as or similar to the USB hub circuit 844 as described with reference to FIG. 8. The USB hub circuit 902 can be powered via USB power received from the embedded computer 416.

The USB hub circuit 902 is connected to a USB circuit 904 and a USB connector 906. The USB circuit 904 can be a circuit implementing a downstream connection to another peripheral USB building device (e.g., daisy chain multiple peripheral USB building devices). The USB hub circuit 902 can be configured to ground, power, and/or connect connection points of a USB connector 906. The USB hub circuit 902 can include amplifier circuits, transceiver circuits, etc. The USB connector 906 can be a physical connector for connecting a downstream peripheral USB device to the USB IOM 418. The USB connector 906 and/or the USB circuit 904 can include a connector, and/or circuitry, for USB-A, USB-B, USB-C, mini-USB, micro-USB, etc. The USB hub circuit 902, the USB circuit 904, and/or the USB connector 906 can facilitate communications between a downstream peripheral USB building device connected to the USB connector 906 and the embedded computer 416 and/or further power the downstream peripheral USB building device via USB power of the embedded computer 416.

The power circuit 956 can be configured to power the USB IOM 418 based on USB power received from the embedded computer 416. The power circuit 956 can be the same as or similar to the power circuit 816. The power circuit 956 can include filter circuits, transformers, buck converters, and/or any other circuit configured to power the USB IOM 418. The power circuit 956 can be a smart isolated or non-isolated power supply.

The processing circuit 914 can be the same as, or similar to, the processing circuit 822 and/or the processing circuit 800. In some embodiments, the processing circuit 914 is a microcontroller, e.g., an 8-bit microcontroller, a 16-bit microcontroller, a 32-bit microcontroller, etc. The processing circuit 914 includes communications circuits connecting the processing circuit 914 to external components of the USB IOM 418. The processing circuit 914 includes a USB circuit 916. The USB circuit 916 can facilitate USB communications between the embedded computer 416 and the processing circuit 914 via the USB connector 900. The USB circuit 916 can be configured to perform communications according to USB 1, USB 2, and/or USB 3, USB 4 standards. The processing circuit 914 can cause the USB circuit 916 to communicate data collected via inputs of the USB IOM 418 to the embedded computer 416. Furthermore, the USB circuit 916 can receive output commands from the embedded computer 416 that the processing circuit 914 can be configured to use to operate outputs of the USB IOM 418.

The USB circuit 916 can facilitate listening tasks for listening for information received via the USB connector 900 from an external device, e.g., the embedded computer 416. Furthermore, a hardware manager, e.g., a device for configuring the USB IOM 418 before and/or during deployment, can communicate with the processing circuit 914 via the USB circuit 916 and/or the USB connector 900. The hardware manager can perform factory resets, configuration, testing, software loading, etc. via the USB circuit 916.

The USB IOM 418 includes various inputs and outputs to receive information from and/or send commands to, physical sensors and/or actuators. The outputs of the USB IOM 418 are analog outputs 938, binary outputs 942, and configurable outputs 954. The USB IOM 418 can command each of the analog outputs 938, the binary outputs 942, and/or the configurable outputs 954 based on USB data received from the embedded computer 416. The outputs can be either current outputs and/or voltage outputs. An output value of the binary outputs 942 can be a binary value, i.e., a high voltage or a low voltage, a high current or a low current. An output of the analog outputs 938 can be a value on a range of values, e.g., across a particular resolution of voltage levels and/or current levels. The configurable outputs 954 can be configured to operate as either analog and/or binary outputs and can be operated by the processing circuit 914 as either an analog output or a binary output according to a configuration received from the embedded computer 416.

The analog outputs 938 can include one or more connectors and/or terminal blocks for connecting equipment to be controlled to the USB IOM 418. The analog outputs 938 can be driven by a pulse wave modulation (PWM) circuit 936. The PWM circuit 936 can be controlled by the processing circuit 914 to generate a PWM wave with a particular duty cycle to generate a particular analog output value for the analog outputs 938. The PWM circuit 936 can be a four channel PWM circuit.

Similarly, a general purpose input/output (GPIO) circuit 940 can be configured to drive the binary outputs 942. The GPIO circuit 940 may include seven input and/or output points. The binary outputs 942 can include one or more connectors and/or terminal blocks for connecting equipment to be controlled to the USB IOM 418. The GPIO circuit 940 can be configured to generate high and/or low voltages and/or current levels based outputs received from the processing circuit 914. In this regard, the embedded computer 416 can command one or more of the binary outputs 942 to a high or low level via USB and the processing circuit 914 can cause the GPIO circuit 940 to implement the command on the binary outputs 942.

Furthermore, the configurable outputs 954 can include a connector and/or terminal block for connecting equipment to be controlled by the USB IOM 418 to the USB IOM 418. The configurable outputs 954 can be driven by a PWM circuit 950 (similar to the PWM circuit 936) and a GPIO circuit 952 (similar to the GPIO circuit 940). The PWM circuit 950 can be a four channel PWM circuit. The GPIO circuit 952 can include four inputs and/or outputs. The USB IOM 418 can receive commands from the embedded computer 416 to operate the configurable outputs 954 as binary and/or analog outputs and receive on, off, and/or variable value commands for the configurable outputs 954 from the embedded computer 416 via USB. The processing circuit 914 can implement the commands on the configurable outputs 954 via the PWM circuit 950 and/or the GPIO circuit 952.

The USB IOM 418 can include binary inputs and/or analog inputs. The USB IOM 418 includes a binary input 934. The binary input 934 can include a connector or terminal block for connecting equipment to the binary input and receive input (e.g., sensor readings, equipment status, actuator feedback, etc.). The binary inputs 934 may provide receive input to a GPIO circuit 932. The GPIO circuit 932 may be similar to the GPIO circuit 940. The processing circuit 914 can read the status of the binary inputs 934 via the GPIO circuit 932 and communicate the status of the binary inputs (e.g., on or off) to the embedded computer 416 via the USB circuit 916.

The universal input connections 930 can include a connector or terminal block for connecting equipment outputs to the USB IOM 418. The universal input connections 930 can be either analog inputs and/or binary inputs. The processing circuit 914 can operate the universal input connections 930 as either analog inputs by converting an analog value received via the universal input connections 930 to a digital value via an ADC circuit 926 and/or by receiving a digital input of the universal input connections 930 via a GPIO circuit 928. The GPIO circuit 928 may be the same as or similar to the GPIO circuit 932. The GPIO circuit 928 can include twenty-eight inputs and/or outputs.

The processing circuit 914 may receive a digital value representing an analog value received via the universal input connections 930 from the universal input connections 930. In some embodiments, the processing circuit 914 communicates with the ADC circuit 926 via a SSPI circuit 922. The SSPI circuit 922 can be a serial communications interface (SCI) providing asynchronous, synchronous, and serial peripheral interface (SPI) support, i.e., SSPI.

The processing circuit 920 includes an RX serial peripheral interface (RSPI) circuit 920 which can facilitate reading and/or writing to a serial flash 908 of the USB IOM 418. Furthermore, the processing circuit 914 includes an inter-integrated circuit (I2C) circuit 924. The I2C circuit 924 can facilitate communications between the processing circuit 914 and a real time clock (RTC) 958, an EEPROM 960 of the USB IOM 418, and a security storage 962 of the USB IOM 418. The security storage 962 can store licensing information, license keys, and/or encryption information (e.g., private keys, public keys, secrets, etc.).

The serial flash 908 may store software images for the processing circuit 914 to run. The software image may be similar to, or the same as, the software modules described within the memory 826 of FIG. 8. In some embodiments, the serial flash 908 stores an indication of a power level required by the USB IOM 418. The USB IOM 418 and/or the embedded computer 416 can negotiate via the USB connection to determine whether and/or how much power the USB IOM 418 receives from the embedded computer 416.

The USB IOM 418 further includes LEDs 964 and switches 968. The LEDs 964 can be operated by the processing circuit 914 to provide indications of whether particular outputs and/or inputs of the USB IOM 418 are in use, whether the USB IOM 418 is powered, whether the USB IOM 418 has encountered a fault, etc. The switches 968 can be dip switches and/or rotary switches. The switches 968 can allow a user to configure the USB IOM 418 in a particular manner. For example, an address, an operating mode, etc. can be set by the user via the switches 968.

The processing circuit 914 includes a universal asynchronous receiver/transmitter (UART) circuit 918. The UART circuit 918 is connected to a transceiver circuit 910 configured to drive an RS485 connector 912 which can be connected to building equipment. The processing circuit 914 can implement one or more protocols over RS485, e.g., BACnet, CAN, etc. Commands for a device connected to the RS485 connector 912 of the USB IOM 418 can be received from the embedded computer 416 via USB and communicated to the equipment via the RS485 connector 912. Furthermore, information received from the equipment via the RS485 connector 912 can be communicated by the processing circuit 914 to the embedded computer 416 via the USB circuit 916.

Figure 10:
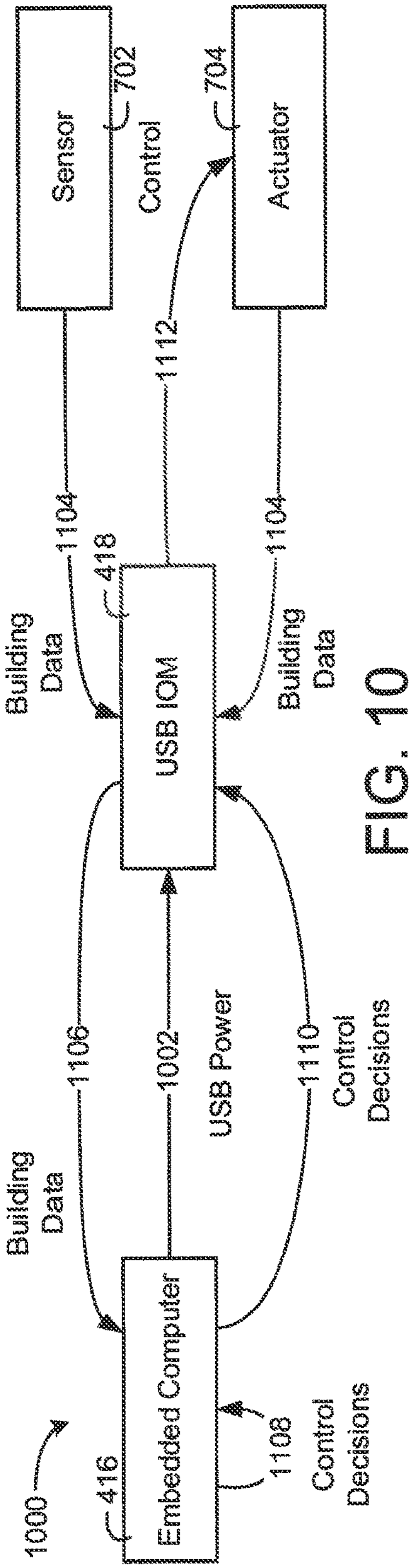
FIG. 10 is a block diagram of the USB IOM of FIG. 7 being managed by the embedded computer, according to an exemplary embodiment.

Referring now to FIG. 10, a system 1000 including the embedded computer 416, the USB IOM 418, the sensor 702, and the actuator 704 is shown, according to an exemplary embodiment. The USB IOM 418 is shown to be powered via USB and communicate with the embedded computer 416 via USB. The USB IOM 418 is shown to collect building data, e.g., environmental conditions sensed by the sensor 702, from the sensor 702. The USB IOM 418 can receive the building data via the binary inputs 934 and/or the universal input connections 930 as described with reference to FIG. 9. Furthermore, control decisions made by the embedded computer 416, e.g., based on the building data where the building data is communicated to the embedded computer 416 via USB, can be communicated to the USB IOM 418. The USB IOM 418 can operate the actuator 704 based on the control decisions. The control decisions can cause the USB IOM 418 to operate the analog outputs 938, the binary outputs 942, and/or the configurable outputs 954 to control the actuator 704.

Figure 11:
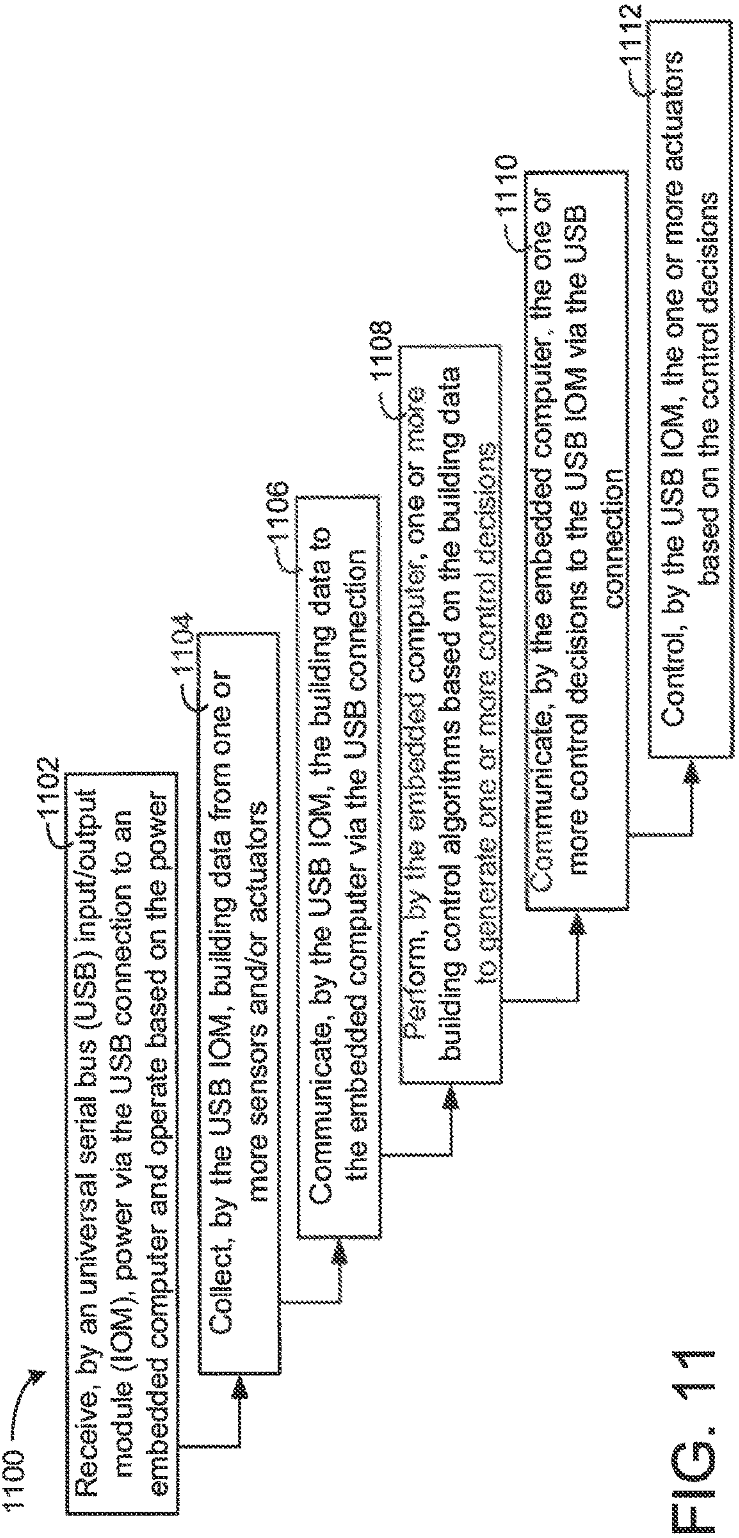
FIG. 11 is a flow diagram of a process of controlling the USB IOM with the embedded computer, according to an exemplary embodiment.

Referring now to FIG. 11, a process 1100 is shown for operating the USB IOM 418 by the embedded computer 416, according to an exemplary embodiment. The process 1100 is described with reference to FIGS. 10-11. The embedded computer 416 and/or the USB IOM 418 can be configured to perform the process 1100. Furthermore, any computer device as described herein can be configured to perform the process 1100.

In step 1102, the USB IOM 418 receives power via a USB connection to the embedded computer 416 and operates based on the received power. For example, the USB IOM 418 can be connected to the embedded computer 416 via the USB connector 900 and the power circuit 956 can power the USB IOM 418 via power received via the USB connector 900 from the embedded computer 416. While powered via the USB power, the IOM 418 can perform various operations, e.g., steps 1104, 1106, and/or 1112.

In the step 1104, the USB IOM 418 can collect building data from the sensor 702 and/or the actuator 704. For example, the building data can be temperature measurements, humidity measurements, air quality measurements, light levels, occupancy detections, etc. sensed by the sensor 702. The building data can further be received from the actuator 704. The building data can be motor temperatures, motor speeds, damper position, and/or any sensed information of a sensor of the actuator 704 and/or recorded operational data of the actuator 704. The building data can be received and collected by the USB IOM 418 via the RS485 connector 912, the universal input connections 930, and/or the binary inputs 934.

In the step 1106, the USB IOM 418 can communicate the building data collected the embedded computer 416 via the USB connection. For example, the USB IOM 418, via the USB circuit 916 of the processing circuit 914, can communicate the collected building data to the embedded computer 416 via the USB circuit 916 and/or the USB connector 900.

In step 1108, the embedded computer 416 can perform one or more building control algorithms based on the building data communicated in the step 1106 to generate one or more control decisions. For example, the embedded computer 416 can receive the collected building data via the USB communications circuit 818 and, the HVAC controller 808 can operate to generate the one or more control decisions.

In step 1110, the embedded computer 416 can communicate the one or more control decisions made in the step 1108 to the USB IOM 418 via the USB connection. The control decisions may be commands to turn on or off various outputs and/or turn on or off the outputs at particular current and/or voltage levels. For example, the control decisions may be to turn on the analog outputs 938 at particular levels and/or turn on or off the binary outputs 942 and/or the configurable outputs 954. In step 1112, based on the control decisions communicated in the step 1110, the USB IOM 418 can implement the control decisions, i.e., command the analog outputs 938, the binary outputs 942, the configurable outputs 954, and/or communicate the commands via the RS485 connector 912.

Figure 12:
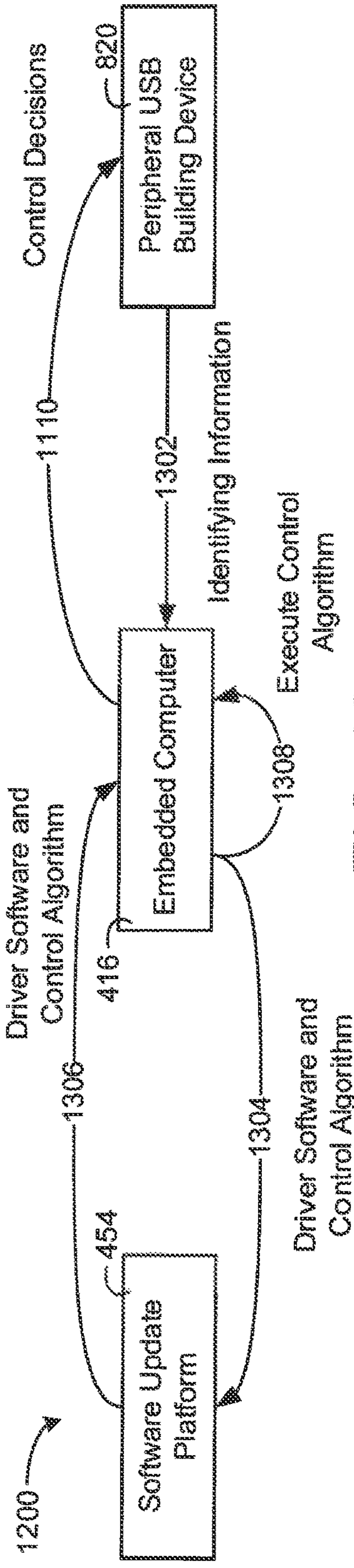
FIG. 12 is a block diagram the peripheral USB building devices and the embedded computer where the embedded computer performs a software update for managing the peripheral USB building device, according to an exemplary embodiment.

Referring now to FIG. 12, a system 1200 including the embedded computer 416 receiving software updates to manage the peripheral USB building device 820 is shown, according to an exemplary embodiment. When the peripheral USB building device 820 is connected, or first connected, to the embedded computer 416, the embedded computer 416 may install software for operating the peripheral USB building device 820. For example, a software driver may enable the embedded computer 416 to communicate via USB with the peripheral USB building device 820 where the software driver is specific to the peripheral USB building device 820. In this regard, the embedded computer 416 can retrieve the software drive from the software update platform 454, the software driver being specific to the peripheral USB building device 820 and install the software driver. Furthermore, in some embodiments, the embedded computer 416 can install a control algorithm for operating the peripheral USB building device 820. The control algorithm may be specific to the peripheral USB building device 820 or specific to a type of the peripheral USB building device 820, e.g., a VAV control algorithm.

Figure 13:
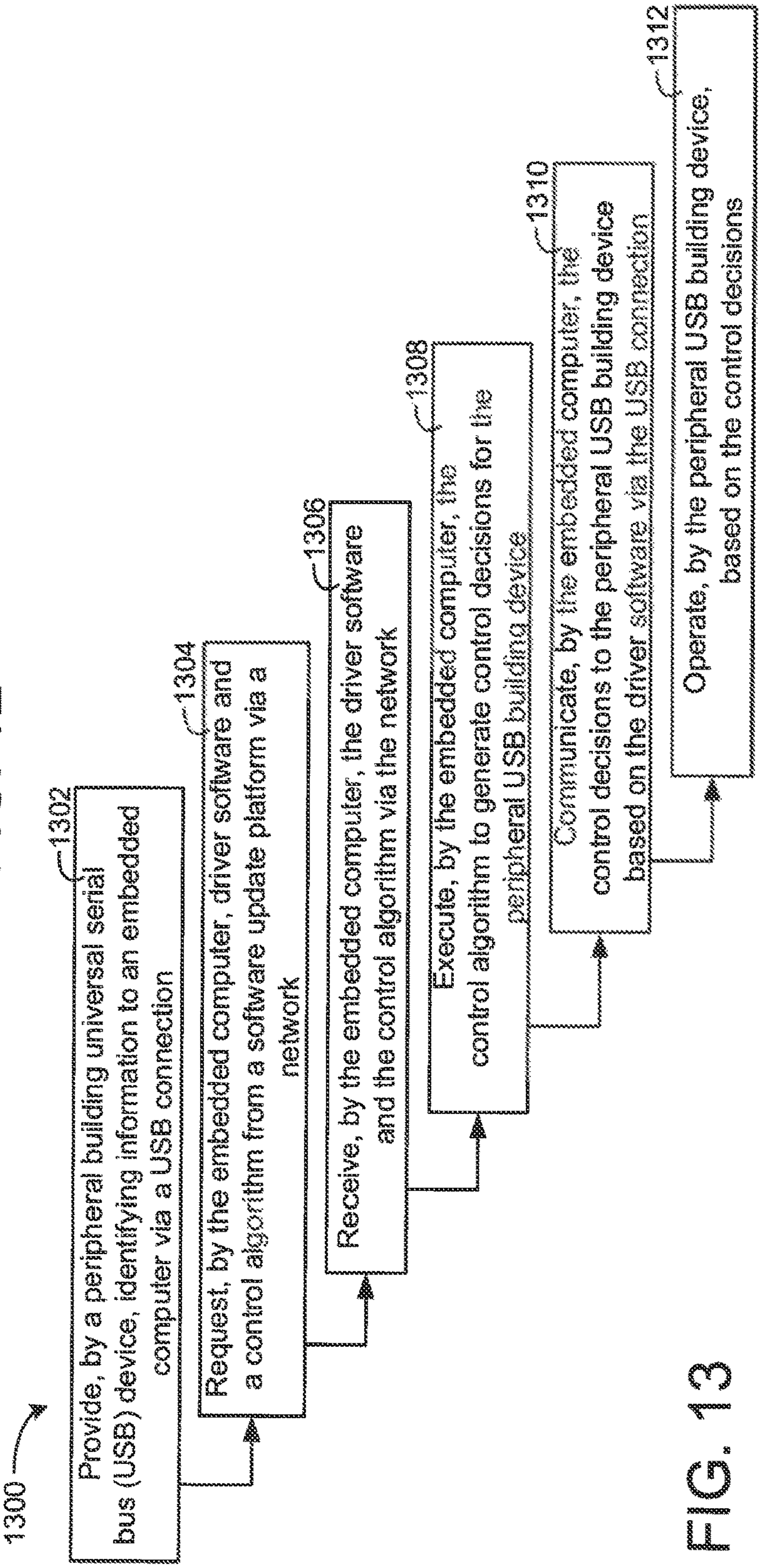
FIG. 13 is a flow diagram of a process of performing a software update by the embedded computer to manage the peripheral USB building device, according to an exemplary embodiment.

Referring now to FIG. 13, a process 1300 is shown for updating software on the embedded computer 416 for operating the peripheral USB building device 820, according to an exemplary embodiment. The process 1300 is described with reference to FIGS. 12-13. The embedded computer 416 and/or the USB IOM 418 can be configured to perform the process 1300. Furthermore, any computer device as described herein can be configured to perform the process 1300.

In step 1302, the peripheral USB building device 820 can provide identifying information to the embedded computer 416 via a USB connection. For example, the peripheral device identifier 834 can provide an indication of a device type, a product ID, a vendor ID, etc. to the embedded computer 416 via the USB communications circuit 836.

In step 1304, the embedded computer 416 can communicate with the software update platform 454 to retrieve driver software and/or control algorithms specific to the identifying information received in the step 1302. The software update platform 454 can store a database of driver software and/or a database of control algorithm software and can respond to a request provided by the embedded computer 416, the request including the identifying information of the step 1304. The request can be communicated to the software update platform 454 via a network, e.g., the Internet, a LAN, etc. In step 1306, responsive to the request, the embedded computer 416 can receive the driver software and control algorithm requested in the step 1304. The software updater 812 can receive and install the driver software and/or control algorithm on the embedded computer 416 for making control decision for the peripheral USB building device 820 and communicating with the peripheral USB building device 820.

In step 1308, the embedded computer can execute the control algorithm received in the step 1306 to generate one or more control decisions for the peripheral USB building device 820. For example, the HVAC controller 808 can execute the control algorithm and generate one or more control decisions, e.g., a temperature setpoint, a valve position, a damper position, etc.

In step 1310, the embedded computer 416 can communicate the control decisions to the peripheral USB building device 820 via a USB connection. For example, the embedded computer 416 can communicate the control decisions to the peripheral USB building device 820 via the USB communications circuit 818. In step 1312, based on the control decisions received in the step 1310, the peripheral USB building device 820 can perform one or more operations according to the receive control decisions.

Figure 14:
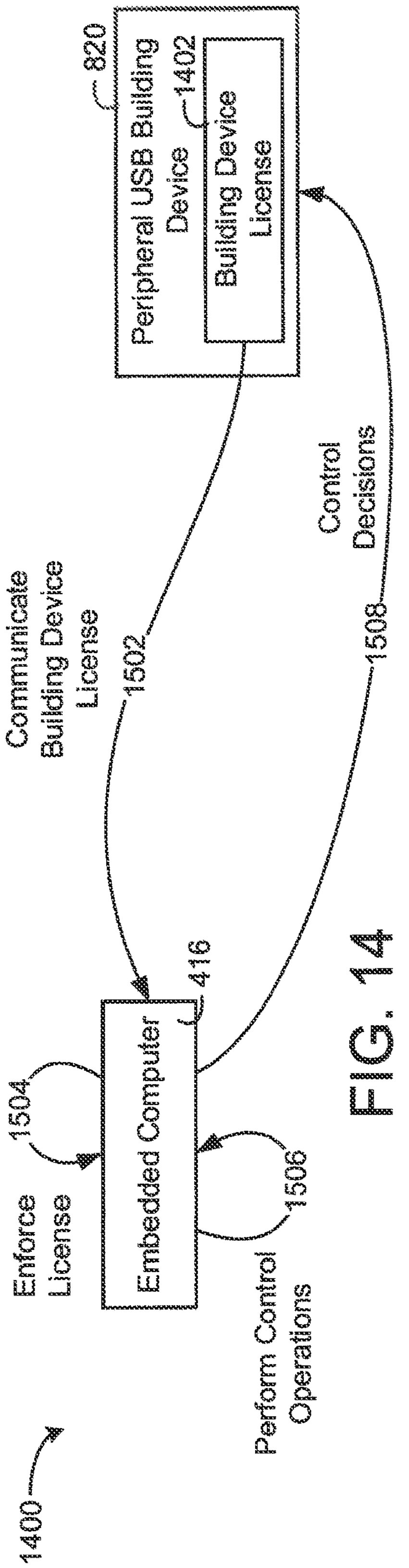
FIG. 14 is a block diagram of a license stored on the peripheral USB building device being enforced on the embedded computer, according to an exemplary embodiment.

Referring now to FIG. 14, a system 1400 including the embedded computer 416 enforcing licenses of the peripheral USB building device 820 is shown. The peripheral USB building device 820 stores a building device license 1402. The building device license 1402 may license and enable the embedded computer 416 to perform one or more control algorithms, generate one or more metrics, etc. As the embedded computer 416 may perform the main computing operations instead of the peripheral USB building device 820, the building device license 1402 can be communicated to the embedded computer 416 and enforced on the embedded computer 416.

Figure 15:
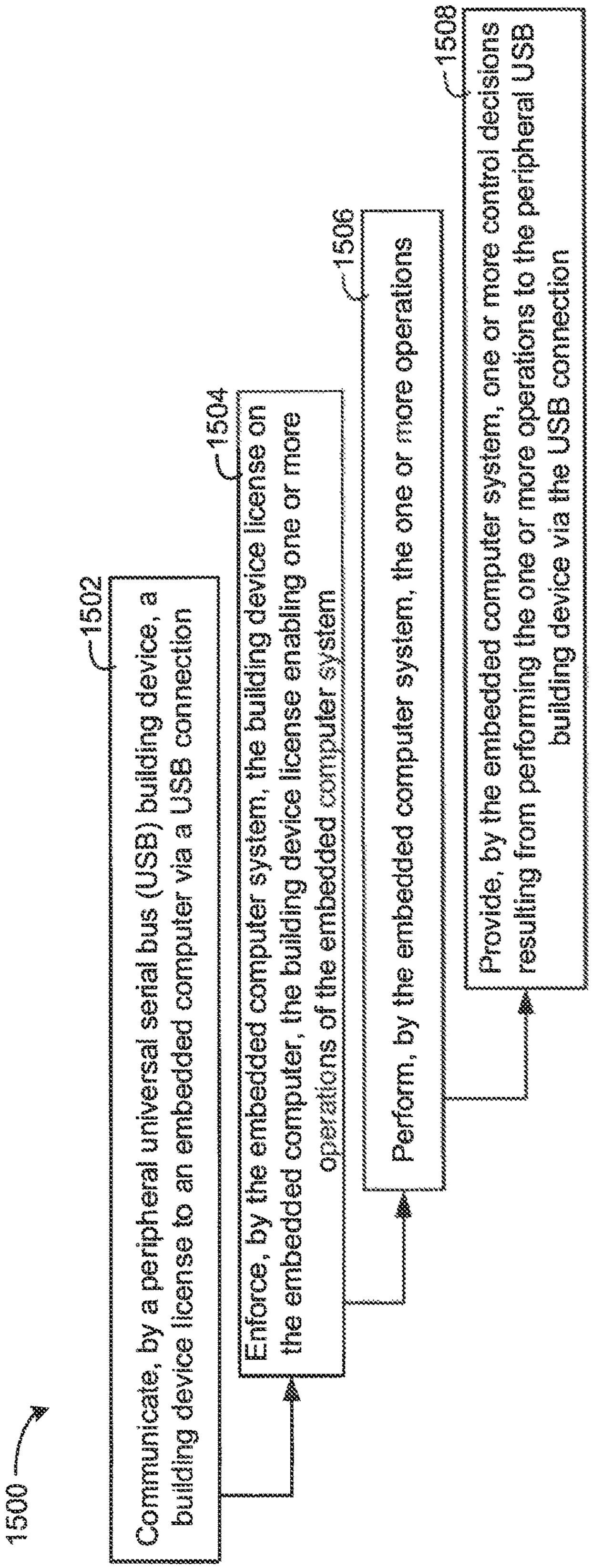
FIG. 15 is a flow diagram of a process of enforcing a license on the embedded computer, the license stored on the peripheral USB building device, according to an exemplary embodiment.

Referring now to FIG. 15, a process 1500 is shown for implementing the building device license 1402 on the embedded computer 416, according to an exemplary embodiment. The process 1500 is described with reference to FIGS. 14-15. The embedded computer 416 and/or the USB IOM 418 can be configured to perform the process 1500. Furthermore, any computer device as described herein can be configured to perform the process 1500.

In step 1502, the peripheral USB building device 820 can communicate the building device license 1402 to the embedded computer 416 via a USB connection. The building device license 1402 can be stored within the license manager 830. The license manager 830 can cause the building device license 1402 to communicate the building device license 1402 to the embedded computer 416 via the USB communications circuit 836.

In step 1504, the embedded computer 416 can enforce the building device license 1402 on the embedded computer 416. The building device license 1402, when enforced, can enable one or more operations of the embedded computer 416 (or disable one or more operations). The license manager 810 can receive the building device license 1402 from the peripheral USB building device 820 via the USB communications circuit 818 and the license manager 810 can enforce the building device license 1402, enable or disabling features such as control algorithms of the HVAC controller 808 and/or analytics programs of the HVAC controller 808.

In step 1506, the embedded computer 416 can perform the one or more operations enabled by the building device license 1402. In some embodiments, the operations are generating metrics and/or performing analytics based on data collected via the USB connection from the peripheral USB building device 820. In some embodiments, the operations are control algorithms, e.g., the control algorithms performed by the HVAC controller 808. The result of the one or more operations can be control decisions generated by the HVAC controller 808. In step 1508, the embedded computer 416 can communicate the control decisions to the peripheral USB building device 820 via the USB connection.

Figure 16:
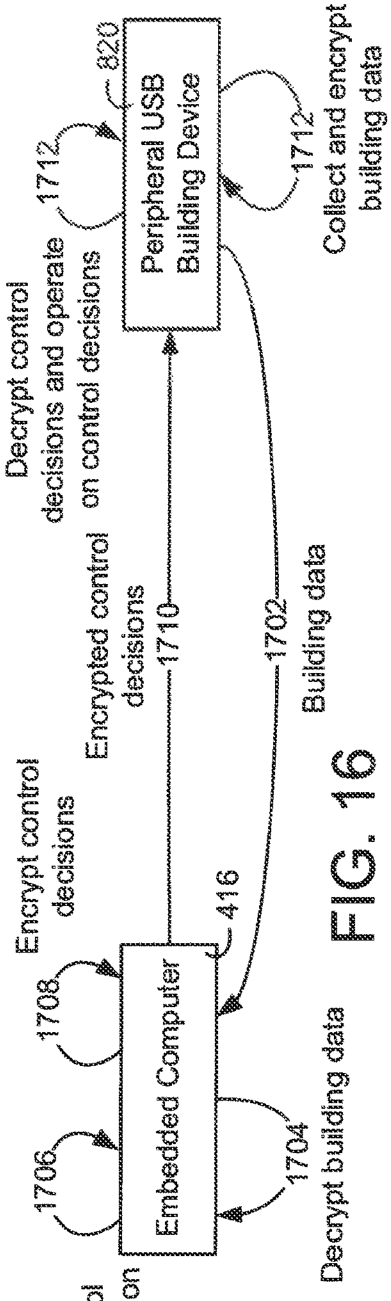
FIG. 16 is a block diagram of the peripheral USB building device and the embedded computer encrypting information communicated over a USB connection, according to an exemplary embodiment.

Referring now to FIG. 16, a system 1600 including the embedded computer 416 and the peripheral USB building device 820 where the embedded computer 416 and the peripheral USB building device 820 communicate over a USB connection with encryption is shown, according to an exemplary embodiment. A USB connection, an in general USB protocols, are not necessarily secure and the information can be reviewed or manipulated by an outside third party. In a building, it may be desirable to encrypt information to prevent an outside user from manipulating the operation of device in the system 1600. Therefore, the information which the embedded computer 416 and the peripheral USB building device 820 communicate via the USB connection can be encrypted.

Figure 17:
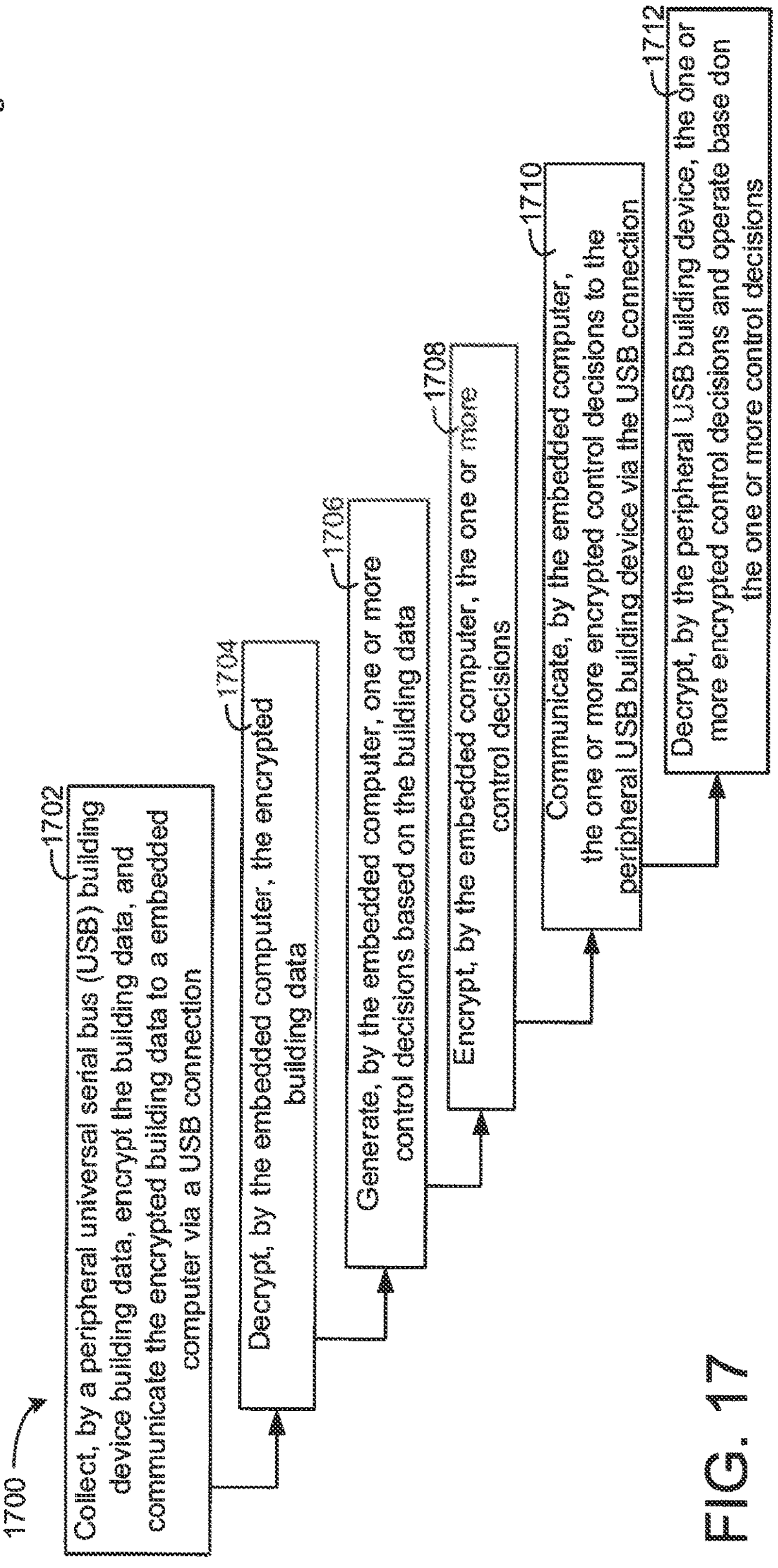
FIG. 17 if a flow diagram of a process of encrypting information and communicating the encrypted information over a USB connection by the peripheral USB building device and the embedded computer, according to an exemplary embodiment.

Referring now to FIG. 17, a process 1700 is shown for encrypting and decrypting information transmitted over a USB connection by the embedded computer 416 and the peripheral USB building device 820 is shown, according to an exemplary embodiment. The process 1700 is described with reference to FIGS. 16-17. The embedded computer 416 and/or the USB IOM 418 can be configured to perform the process 1700. Furthermore, any computer device as described herein can be configured to perform the process 1700.

In step 1702, the peripheral USB building device 820 can collect building data. For example, if the peripheral USB building device 820 includes a sensor, the USB building device 820 can collect sensor readings. Similarly, if the peripheral USB building device 820 includes an actuator, the peripheral USB building device 820 can collect actuator data. The peripheral USB building device 820 can encrypt the building data. For example, the encryption manager 828 can be configured to encrypt the building data via one or more encryption algorithms RSA, elliptic curve encryption, etc. The peripheral USB building device 820 can communicate the encrypted building data to the embedded computer 416 via the USB communications circuit 836.

In step 1704, the peripheral USB building device 820 can receive the encrypted building data via the USB connection and decrypt the encrypted building data. For example, the encrypted building data can be received by the embedded computer 416 via the USB communications circuit 818 and the encryption manager 806 can be configured to decrypt the encrypted building data. The resulting building data can be provided to the HVAC controller 808. In step 1706, the embedded computer 416 can generate one or more control decisions based on the building data. For example, the HVAC controller 808 can perform a control algorithm based on the building data.

In step 1708, the one or more control decisions can be encrypted by the embedded computer 416. For example, the encryption manager 806 can encrypt the one or more control decisions. In step 1710, the embedded computer 416 can communicate the one or more encrypted control decisions to the peripheral USB building device 820 via the USB connection. For example, the embedded computer 416 can communicate the one or more encrypted control decisions to the peripheral USB building device 820 via the USB communications circuit 818.

In step 1712, the peripheral USB building device 820 can decrypt the one or more encrypted control decisions and operate based on the one or more control decisions. For example, the encryption manager 828 can be configured to decrypt the encrypted one or more control decisions and the peripheral USB building device can be configured to perform one or more operations (e.g., operating an actuator) based on the control decisions.

Figure 18:
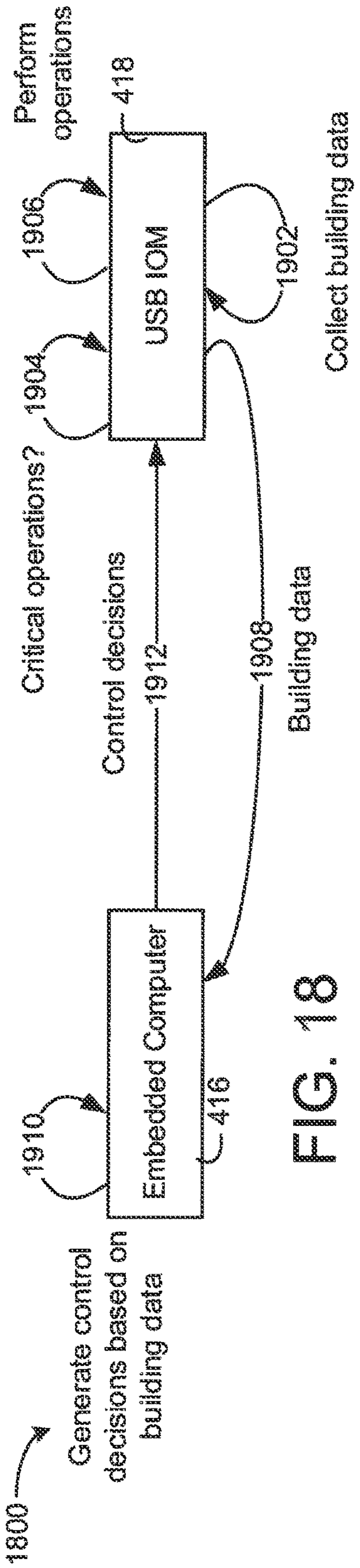
FIG. 18 is a block diagram of the USB IOM performing critical operations and the embedded computer causing the USB IOM to perform non-critical operations, according to an exemplary embodiment.

Referring now to FIG. 18, a system 1800 including the embedded computer 416 and the USB IOM 418 where the USB IOM 418 performs critical operations without requiring decision making by the embedded computer 416, according to an exemplary embodiment. Normally, the USB IOM 418 can collect sensor data from sensors connected to the USB IOM 418 and communicate the sensor data to the embedded computer for decision making via USB. However, if the sensor data indicates a situation where a time critical response is required (e.g., to respond to a building emergency), the USB IOM 418 can itself perform one or more operations, e.g., control one or more actuators connected to the USB IOM 418 based on the collected sensor data.

Figure 19:
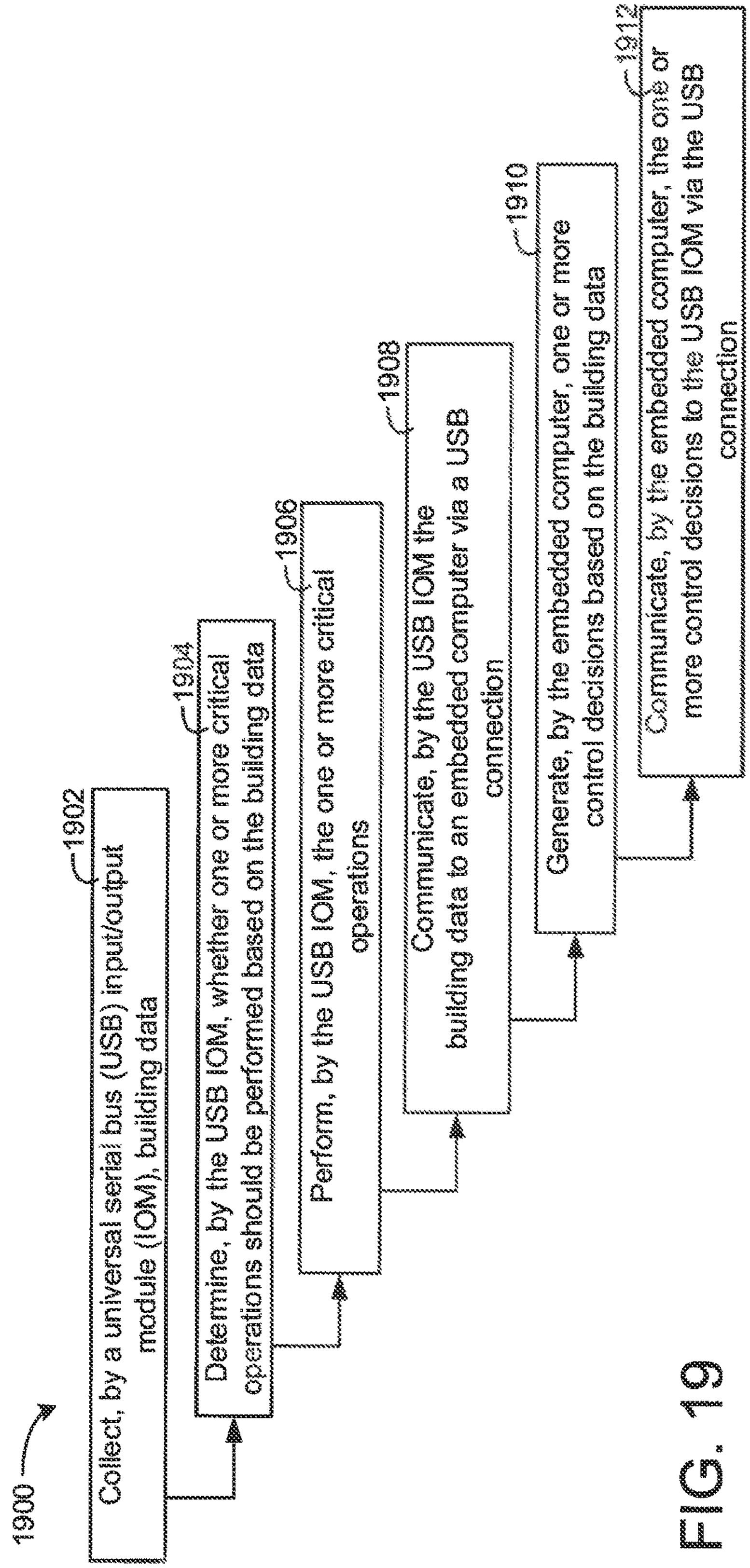
FIG. 19 is a flow diagram of a process of performing critical operations by the USB IOM and causing, by the embedded computer, the USB IOM to perform non-critical operations, according to an exemplary embodiment.

Referring now to FIG. 19, a process 1900 is shown for performing critical operations by the USB IOM 418 is shown, according to an exemplary embodiment. The process 1900 is described with reference to FIGS. 18-19. The embedded computer 416 and/or the USB IOM 418 can be configured to perform the process 1900. Furthermore, any computer device as described herein can be configured to perform the process 1900.

In step 1902, the USB IOM 418 can collect building data. For example, the USB IOM 418 can collect building data via universal input connections 930, the binary inputs 934, the RS485 connection 912 via sensors or other building devices connected to those respective inputs. For example, a smoke detector could be connected to the USB IOM 418 and provide a smoke level (or a binary smoke presence indication) to the USB IOM 418.

In step 1904, the USB IOM 418 can determine whether one or more critical operations should be performed based on the building data. For example, the USB IOM 418 can include the critical operations manager 832. The critical operations manager 832 can include a set of rules and compare the building data of the step 1902 to the rules to identify whether one or more operations should be performed. For example, a rule may indicate if there is a fire, dampers should be operated to prevent airflow throughout a building. Similarly, if there is a fire, another rule may indicate that all heating coils of a building should be turned off. In this regard, if a smoke detector connected to the USB IOM 418 indicates the presence of an emergency condition, i.e., fire, the USB IOM 418 can generate one or more critical response operations, e.g., operate a damper, heating coil, and/or any other building component. Other emergency responses may be present for heavy rain, tornados, hurricanes, etc.

In step 1906, without intervention of the embedded computer 416, the USB IOM 418 can perform the one or more critical operations determined in the step 1906. In some embodiments, the USB IOM 418 generates outputs to implement the critical operations via the RS485 connector 912, the analog outputs 938, and/or the configurable outputs 954. In step 1908, the USB IOM 418 can communicate the building data to the embedded computer 416 via a USB connection. In step 1910, the embedded computer 416 can generate one or more control decisions for the USB IOM 418 based on the building data. In step 1912, the embedded computer 416 can communicate the one or more control decisions to the USB IOM 418 via the USB connection. The steps 1908-1912 may be similar to the steps 1106-1112 of FIG. 11.

Figure 20:
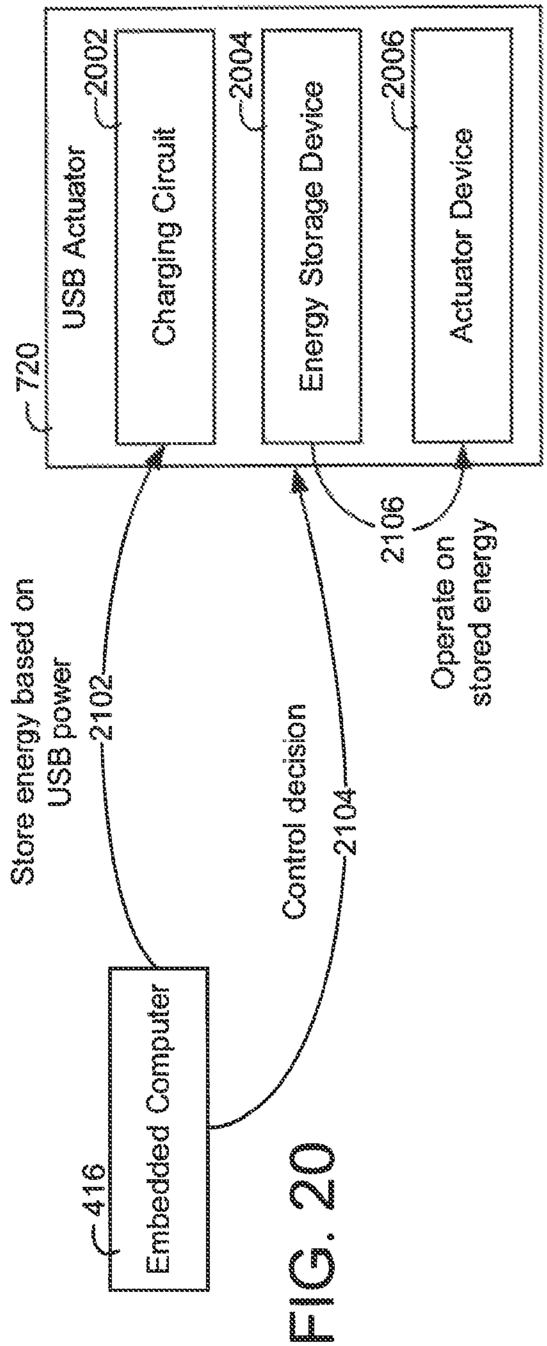
FIG. 20 is a block diagram of a USB actuator charging an energy storage device via power supplied by the embedded computer via a USB connection where energy of the energy storage device is used by the USB actuator to operate an actuator device, according to an exemplary embodiment.

Referring now to FIG. 20, a system 2000 including the embedded computer 416 and the USB actuator 720 where the USB actuator 720 charges an energy storage device via USB power, according to an exemplary embodiment. The USB actuator 720 may be powered on USB power received from the embedded computer 416. However, when the USB actuator 720 is receives an operation command from the embedded computer 416 via the USB connection, the USB actuator 720 may operate an actuator device 2006 to fulfill the command. The actuator device 2006 can be a damper motor, a valve motor, and/or any other high power consuming device.

The USB power may not be sufficient to power the actuator device 2006. In this regard, the USB actuator 720 can, via a charging circuit 2002, charge an energy storage device 2004. In response to receiving the command to operate the actuator device 2006, the charging circuit 2002 can cause the energy storage device 2004 to discharge and provide power to the actuator device 2006. The energy storage device 2004 is a capacitor (e.g., a super-capacitor). The energy storage device 2004 can include one or multiple ceramic capacitors, film capacitors, etc. The energy storage device 2004 can be a battery. For example, energy storage device 2004 can be a lithium-ion (Li-ion) battery, a nickel cadmium (Ni—Cd), a nickel-metal hydride (Ni-MH) battery, a lead-acid battery, and/or any other type of energy storage device configured to store and discharge energy.

In some embodiments, multiple USB actuators with energy storage devices are connected to the embedded computer 416. If each of the USB actuators simultaneously charge their energy storage devices via the USB power, the embedded computer 416 may not be able to supply enough USB power and/or the USB connection may not support such a high power draw. In this regard, the USB actuators may have charging priorities that the embedded computer 416 manages. This enables the USB actuators to take turns charging their energy storage devices according to the embedded computer 416.

Figure 21:
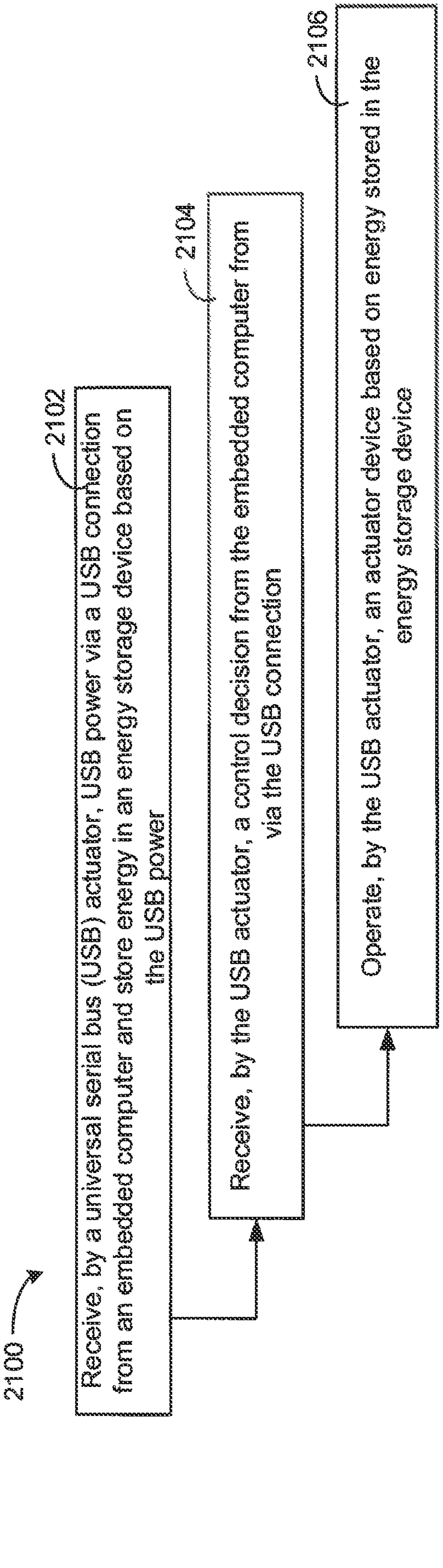
FIG. 21 is a flow diagram of a process of charging, by the USB actuator, the energy storage device via the USB connection to the embedded computer, and operating, by the USB actuator, the actuator device based on energy of the energy storage device, according to an exemplary embodiment.

Referring now to FIG. 21, a process 1900 is shown for performing critical operations by the USB IOM 418 is shown, according to an exemplary embodiment. The process 1900 is described with reference to FIGS. 18-19. The embedded computer 416 and/or the USB IOM 418 can be configured to perform the process 1900. Furthermore, any computer device as described herein can be configured to perform the process 1900.

In step 2102, the USB actuator 720 can receive USB power via a USB connection from the embedded computer 416. The charging circuit 2002 of the USB actuator 720 can cause the energy storage device 2004 to charge based on the USB power and store energy. Step 2102 may be performed over a significant amount of time, e.g., minutes, hours, days, etc. In step 2104, the USB actuator 720 can receive a control decision from the embedded computer 416 via the USB connection. In response to receiving the control decision in the step 2104, the USB actuator 720 can operate the actuator device 2006 by discharging the energy storage device 2004 to implement the control decision in step 2106.

Figure 22:
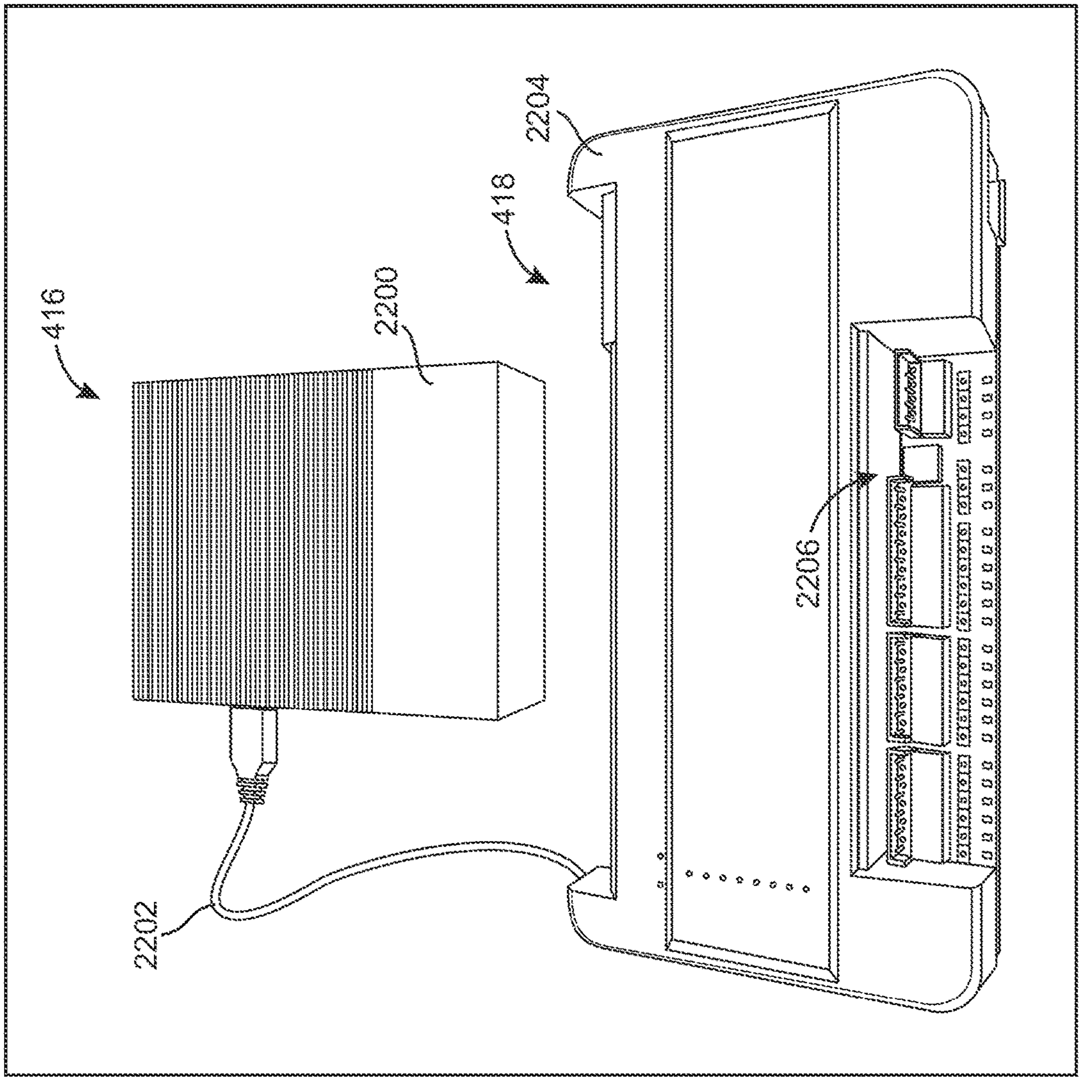
FIG. 22 is a perspective schematic drawing of the embedded computer and the USB IOM, according to an exemplary embodiment.

Referring now to FIG. 22 a schematic drawing of the embedded computer 416 and the USB IOM 418 is shown, according to an exemplary embodiment. The embedded computer 416 is shown to include an enclosure 2200. Similarly, the USB IOM 418 is shown to include an enclosure 2204. A USB cable, 2202, forms a USB connection between the embedded computer 416 and the USB IOM 418 enabling the embedded computer to receive building data collected via the USB IOM 418, e.g., by reading the inputs of the USB IOM 418 via USB, and/or command the outputs of the USB IOM 418. The USB cable may be 10 meters or less in length. The inputs and outputs, i.e., the RS485 connector, the universal input connections 930, the binary inputs 934, the analog outputs 938, the binary outputs 942, and the configurable outputs 954 are shown in the terminal blocks 2206.

Wiring Infrastructure

Figure 23:
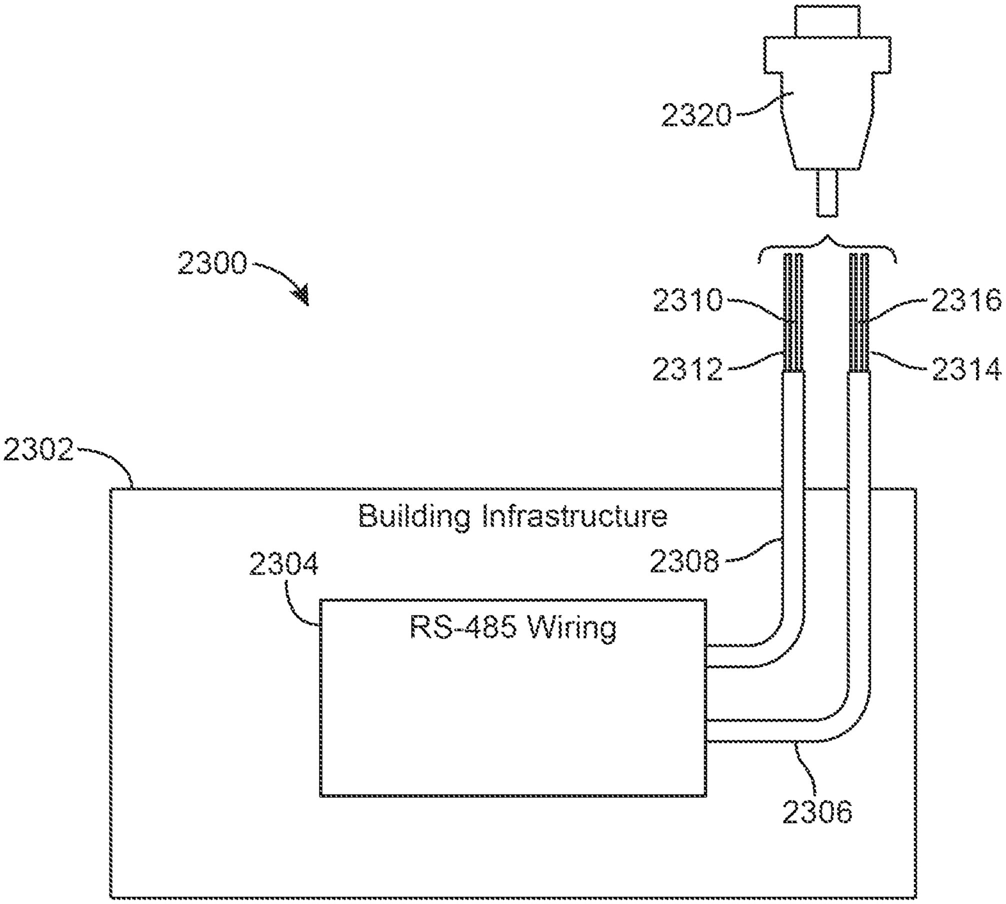
FIG. 23 is a general block diagram schematic drawing of the wiring infrastructure for any of the systems, networks, devices, modules, and flow diagrams illustrated in FIGS. 4-22, according to an exemplary embodiment.

With reference to FIG. 23, a building infrastructure 2302 for building 10 (FIG. 1) includes wiring 2304. Wiring 2304 can be RS-485 or RS 232, Ethernet twisted pair, or telephone wiring in some embodiments. In some embodiments, wiring 2304 is a combination of one or more of the above. Wiring 2304 can be used to provide connections for the USB components discussed above. For example, the systems and methods discussed above can be implemented using wiring 2304 existing in building 10 that is repurposed for the USB interfaces described with reference to FIGS. 4-22.

In some embodiments, wiring 2304 is RS485 wiring existing in an existing building. The wiring 2304 is twisted pair wiring in some embodiments is pre-wired. Wiring 2304 has a first cable 2308 with a twisted pair including a conductor 2310 and 2312. Wiring 2304 has a second cable 2306 with a twisted pair including a conductor 2312 and 2314. Cables 2308 and 2306 can be combined and include multiple twisted pairs (e.g., 2, 4, 6, 8, 16, etc. twisted pairs) in some embodiments. In some embodiments, the cables 2308 and 2306 include additional shielding and grounding wires. In some embodiments, cables 2308 and 2306 are not shielded.

Cables 2308 and 2306 are configured to have a USB interface in some embodiments. The USB interface can include a USB socket or port and/or a USB plug 2320. The USB plug can have a data plus, a data minus, a power, and a ground terminal in some embodiments. The power terminal can be a +5V terminal. The USB interface may include one or more USB interface ICs, such as for hubs and/or switches and/or repeaters. Cables 2308 and 2306 can be used to provide data and or power to any of the USB components discussed above with reference to FIGS. 4-22.

Conductors 2310, 2312, 2314, and 2316 can each be associated with one of the data plus, data minus, power, and ground terminals in some embodiments. In some embodiments, the data plus, and data minus terminals are associated with conductors 2310 and 2312. In some embodiments, the power, and ground terminals are associated with conductors 2314 and 2316. Using USB over twisted pair associated with existing cables 2308 and 2310 the cost of re-wiring buildings for USB infrastructure is reduced. Conductors 2310, 2312, 2314, and 2316 can be 28 AWG individually coated copper wires. Other wire gauges or materials are possible—24, 26, 30 AWG, etc. In some embodiments, existing wiring of several types can be used to connect to components. For example, conductors from RS485 infrastructure can be connected to USB wiring or other existing wiring (ethernet, telephone, etc.) to make a run for the components.

Advantageously, USB connections are made using twisted pair wires in some embodiments, (e.g., RS-485 or RS 232, Ethernet twisted pair, or telephone wiring). The USB interface can be a USB type a, type b, type c, type d, or micro a, micro b, mini a, mini b, and micro b super speed in some embodiments. The D± signals used by low, full, and high speed are carried over a twisted pair (typically unshielded) to reduce noise and crosstalk in some embodiments. In some embodiments, where cables 2308 and 2310 have sufficient diameter, number of pairs, and shielding, super speed modes can use separate transmit and receive differential pairs. Cables 2308 and 2310 can be configured in accordance with the USB 1.1 standard, the USB 2.0 standard, or the USB 3.0 standard in some embodiments. The USB 1.1 standard, the USB 2.0 standard, and the USB 3.0 standard specifications are incorporated herein by reference in their entireties. In some embodiments, USB communication ICs can operate at lower transmission and reception rates to accommodate the quality of mediums that use existing wiring. In some embodiments, USB communication ICs can operate at lower charging rates to accommodate the quality of mediums that use existing wiring. The USB communication ICs can be programmed with configuration data to reflect the use of the existing wiring and associated lengths in some embodiments. In some embodiments, the ICs include configurable memories for storing the configuration data.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the word "building" mentioned throughout this document can also be interpreted as an enclosed space such as an airplane or a vehicle. The position of elements can be reversed or otherwise varied, and the nature or number of discrete elements or positions can be altered or varied. For example, a USB host can become a USB building device and a USB building device can become a USB host (role switch) when using/connecting to a "gumstick" or "On-the-Go" USB. The embedded computer can have a processor for decision generation, or it may use an external processor located in a cloud and from an USB device such as a "gumstick" or "On-the-Go" USB device with its own processing capabilities to add features, offload processing from the embedded PC, etc. The peripheral building devices which are connected directly or indirectly to the embedded PC via the USB host, or another USB connection may include other downstream USB devices which are connected directly or indirectly to the peripheral building devices. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building system of a building, the building system comprising:
- an embedded computer, the embedded computer comprising one or more circuits configured to:
  - implement a universal serial bus (USB) host and communicate with one or more of peripheral USB building devices via at least one of a USB connection or the USB host;
  - receive identifying information, from the one or more of peripheral USB building devices, and identify a driver software for the one or more peripheral USB building devices;
  - receive building data from at least one of the one or more of peripheral USB building devices;
  - generate one or more control decisions for the one or more of peripheral USB building devices, wherein the one or more control decisions include at least one of a temperature setpoint, a valve position, or a damper position associated with the one or more peripheral USB building devices; and
  - communicate the one or more control decisions to the one or more of the peripheral USB building devices via the USB connection with the driver software; and
- the one or more of peripheral USB building devices, wherein the one or more of the peripheral USB building devices are connected to the USB host via the USB connection to the embedded computer, wherein the USB connection is provided using RS-485, RS 232, Ethernet twisted pair, or telephone wiring.

2. The building system of claim 1, wherein the embedded computer is connected to an Ethernet network and receives power over Ethernet (POE), wherein the embedded computer is configured to power the one or more circuits based on the POE and provide USB power to the one or more of the peripheral USB building devices via the PoE.

3. The building system of claim 1, wherein a first peripheral USB building device of the one or more of the peripheral USB building devices comprises a USB hub circuit;
- wherein a second peripheral USB building device of the one or more of peripheral USB building devices communicates to the embedded computer via a first USB connection to the USB hub circuit of the first peripheral USB building device and a second USB connection between the USB hub circuit and the embedded computer.

4. The building system of claim 1, wherein the one or more of the peripheral USB building devices is configured to communicate the identifying information to the embedded computer in response to being connected to the embedded computer via the USB connection;
- wherein the one or more circuits of the embedded computer are configured to:
  - receive a control algorithm for the one or more peripheral USB building devices; and
  - generate the one or more control decisions for the one or more peripheral USB building devices based on the control algorithm.

5. The building system of claim 1, wherein a first peripheral USB building device of the one or more of the peripheral USB building devices is configured to:
- store licensing data associated with one or more features for the first peripheral USB building device; and
- communicate the licensing data to the embedded computer via the USB connection in response to being connected to the embedded computer via the USB connection;
- wherein the one or more circuits of the embedded computer are configured to:
  - receive the licensing data via the USB connection;
  - enforce the licensing data on the one or more circuits enabling the one or more features; and
  - perform the one or more features by generating result data based on collected building data of the first peripheral USB building device or performing one or more control operations for the first peripheral USB building device.

6. The building system of claim 1, wherein the system further comprises a USB host actuator, wherein the USB host actuator is configured to connect to an Ethernet network and implement a second USB host, wherein the USB host actuator is configured to facilitate communication between a site director system connected to the Ethernet network and a second one or more of the peripheral USB building devices connected via the USB connection to the USB host actuator.

7. The building system of claim 1, wherein the embedded computer and the one or more of the peripheral USB building devices form an air handler unit (AHU) package, wherein the embedded computer is configured to perform one or more control operations for an AHU and the one or more of the peripheral USB building devices are AHU sensors and AHU actuators of the AHU.

8. The building system of claim 1, wherein the one or more of the peripheral USB building devices receive USB power from at least one of the embedded computer and a USB power injector and operates based on the USB power.

9. The building system of claim 8, further comprising a USB actuator, wherein the USB actuator comprises:
- an actuator device configured to operate to control an environmental condition of the building;
- an energy storage device configured to store energy and discharge the energy; and
- a charging circuit configured to:
  - receive the USB power from the embedded computer and charge the energy storage device based on the USB power;
  - receive a command, via a USB connection, to operate the actuator device from the embedded computer; and
  - operate the actuator device by causing the energy storage device to discharge the energy.

10. The building system of claim 1, wherein the system further comprises a USB host gateway, wherein the USB host gateway is configured to connect to an Ethernet network and implement a second USB host, wherein the USB host gateway is configured to facilitate communication between a site director system connected to the Ethernet network and a second one or more of the peripheral USB building devices connected via the USB connection to the USB host gateway.

11. The building system of claim 10, wherein the USB host gateway is further configured to implement a USB hub.

12. The building system of claim 1, wherein a first peripheral USB building device of the one or more of the peripheral USB building devices is configured to:

collect building data and encrypt the building data;

communicate the encrypted building data to the embedded computer via the USB connection;

receive encrypted operational data encrypted by the embedded computer, the encrypted operational data generated by the embedded computer based on the building data; and decrypt the encrypted operational data and operate based on the operational data.

13. The building system of claim 12, wherein the one or more circuits of the embedded computer are configured to:

receive the encrypted building data from the first peripheral USB building device;

decrypt the encrypted building data and generate operational data based on the building data; and encrypt the operational data and communicate the encrypted operational data to the first peripheral USB building device via the USB connection.

14. The building system of claim 1, wherein the one or more of the peripheral USB building devices comprise a USB input and output module (IOM);

wherein the USB IOM comprises one or more second circuits, one or more physical inputs, and one or more physical outputs;

wherein the one or more second circuits are configured to:

receive the building data via the one or more physical inputs;

communicate the building data to the embedded computer via a USB connection;

receive the one or more control decisions via the USB connection from the embedded computer; and operate the one or more physical outputs based on the one or more control decisions.

15. A method of connecting components in a building system of a building, the building system comprising an embedded computer, the method comprising:

providing a universal serial bus (USB) using RS-485, RS 232, Ethernet twisted pair, or telephone wiring;

receiving identifying information, from one or more of peripheral USB building devices, and identify a driver software for the one or more peripheral USB building devices;

receiving building data from the one or more of the peripheral USB building devices using the USB; and providing one or more control decisions for the one or more of the peripheral USB building devices for communication to the one or more of the peripheral USB building devices via the USB with the driver software, wherein the one or more control decisions include at least one of a temperature setpoint, a valve position, or a damper position associated with the one or more peripheral USB building devices.

16. The method of claim 15, wherein the one or more of the peripheral USB building devices are connected to a USB host via a USB connection.

17. The method of claim 15, wherein the USB RS-485, RS 232, Ethernet twisted pair, or telephone wiring comprises existing building wiring.

18. A building system of a building, the building system comprising:

a computer comprising one or more circuits configured to:

receive building data from one or more of peripheral USB building devices over a universal serial bus (USB) comprising wiring for an RS-485 bus, a RS 232 bus, an Ethernet, or a telephone;

receive identifying information, from the one or more of the peripheral USB building devices, and identify a driver software for the one or more peripheral USB building devices;

provide one or more control decisions for the one or more of the peripheral USB building devices, wherein the one or more control decisions include at least one of a temperature setpoint, a valve position, or a damper position associated with the one or more peripheral USB building devices; and communicate the one or more control decisions to the one or more of the peripheral USB building devices via the USB with the driver software.

19. The building system of claim 18, wherein the one or more control decisions are provided from an external cloud-based processor.

20. The building system of claim 19, wherein the external cloud-based processor is USB device.

21. A building system of a building, the building system comprising:

an embedded computer, the embedded computer comprising one or more circuits configured to:

implement a universal serial bus (USB) host and communicate with one or more of peripheral USB building devices via at least one of a USB connection or the USB host;

receive building data from at least one of the one or more of the peripheral USB building devices;

generate one or more control decisions for the one or more of the peripheral USB building devices; and communicate the one or more control decisions to the one or more of the peripheral USB building devices via the USB connection; and the one or more of the peripheral USB building devices, wherein the one or more of the peripheral USB building devices are connected to the USB host via the USB connection to the embedded computer, wherein the USB connection is provided using RS-485, RS 232, Ethernet twisted pair, or telephone wiring, wherein at least a first peripheral USB building device of the one or more of the peripheral USB building devices is configured to communicate identifying information to the embedded computer in response to being connected to the embedded computer via the USB connection;

wherein the one or more circuits of the embedded computer are configured to:

receive the identifying information and identify driver software for the first peripheral USB building device and a control algorithm for the first peripheral USB building device;

generate the one or more control decisions for the first peripheral USB building device based on the control algorithm; and communicate the one or more control decisions to the first peripheral USB building device via the USB connection with the driver software.

22. A building system of a building, the building system comprising:

an embedded computer, the embedded computer comprising one or more circuits configured to:

implement a universal serial bus (USB) host and communicate with one or more of peripheral USB building devices via at least one of a USB connection or the USB host;

receive building data from at least one of the one or more of the peripheral USB building devices;

generate one or more control decisions for the one or more of the peripheral USB building devices; and communicate the one or more control decisions to the one or more of the peripheral USB building devices via the USB connection; and the one or more of peripheral USB building devices, wherein the one or more of the peripheral USB building devices are connected to the USB host via the USB connection to the embedded computer, wherein the USB connection is provided using RS-485, RS 232, Ethernet twisted pair, or telephone wiring, wherein the system further comprises:

a USB host actuator, wherein the USB host actuator is configured to connect to an Ethernet network and implement a second USB host, wherein the USB host actuator is configured to facilitate communication between a site director system connected to the Ethernet network and a second one or more of the peripheral USB building devices connected via the USB connection to the USB host actuator.

* * * * *